US011323722B2

(12) United States Patent
Yi et al.

(10) Patent No.: US 11,323,722 B2
(45) Date of Patent: May 3, 2022

(54) ARTISTIC INTENT BASED VIDEO CODING

(71) Applicant: InterDigital Madison Patent Holdings, SAS, Paris (FR)

(72) Inventors: Byung K. Yi, San Diego, CA (US); Yan Ye, San Diego, CA (US); Yuwen He, San Diego, CA (US); Xiaoyu Xiu, San Diego, CA (US); Yong He, San Diego, CA (US); Ralph Neff, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 89 days.

(21) Appl. No.: 15/567,966

(22) PCT Filed: Apr. 21, 2016

(86) PCT No.: PCT/US2016/028597
§ 371 (c)(1),
(2) Date: Oct. 19, 2017

(87) PCT Pub. No.: WO2016/172314
PCT Pub. Date: Oct. 27, 2016

(65) Prior Publication Data
US 2018/0146197 A1    May 24, 2018

Related U.S. Application Data

(60) Provisional application No. 62/150,831, filed on Apr. 21, 2015.

(51) Int. Cl.
*H04N 19/167*    (2014.01)
*H04N 19/186*    (2014.01)
(Continued)

(52) U.S. Cl.
CPC ......... *H04N 19/167* (2014.11); *H04N 19/115* (2014.11); *H04N 19/124* (2014.11);
(Continued)

(58) Field of Classification Search
CPC .... H04N 19/167; H04N 19/85; H04N 19/162; H04N 19/17; H04N 19/182
See application file for complete search history.

(56) References Cited

U.S. PATENT DOCUMENTS 6,075,619 A      6/2000   Iizuka
8,315,466 B2 *  11/2012   El-Maleh ........... H04N 21/4621
                                                        382/232

(Continued)

FOREIGN PATENT DOCUMENTS

CN    101563925 A    10/2009
JP    H07-154798 A    6/1995
(Continued)

OTHER PUBLICATIONS

Digital Cinema Initiatives, "Digital Cinema System Specification", Version 1.2 with Errata as of Aug. 30, 2012 Incorporated, Oct. 10, 2012, pp. 1-155.
(Continued)

*Primary Examiner* — Boubacar Abdou Tchoussou
(74) *Attorney, Agent, or Firm* — Condo Roccia Koptiw LLP

(57) ABSTRACT

Expressions of artistic intent are identified (e.g. by signaling or content analysis) and expressed as a set of artistic intent positions P.sub.ART and artistic intent characteristics C.sub.ART. Artistic intent characteristics C.sub.ART may be signaled and used to identify artistic intent positions P.sub.ART. Artistic intent preservation coding and processing may be applied to sample positions P.sub.ART to preserve characteristics C.sub.ART. A coding user interface may
(Continued)

permit a user to specify an artistic set (e.g. P.sub.ART and/or C.sub.ART) and to select and/or configure treatment of pixels and/or blocks associated with an artistic set, such as a fidelity enhancement, QP adjustment value and/or post-processing. Content priority or importance levels may be impliedly and/or expressly indicated at fine (e.g. pixel, sample) and/or coarse (e.g. block) levels of content for varying (e.g. enhanced, reduced) levels of treatment in content coding, delivery, processing and/or error resilience/robustness.

24 Claims, 16 Drawing Sheets

(51) Int. Cl.
<br>  *H04N 19/85*    (2014.01)
<br>  *H04N 19/182*   (2014.01)
<br>  *H04N 19/14*    (2014.01)
<br>  *H04N 19/124*   (2014.01)
<br>  *H04N 19/115*   (2014.01)
<br>  *H04N 19/17*    (2014.01)
<br>  *H04N 19/162*   (2014.01)

(52) U.S. Cl.
<br>  CPC ........... *H04N 19/14* (2014.11); *H04N 19/162* (2014.11); *H04N 19/17* (2014.11); *H04N 19/186* (2014.11); *H04N 19/85* (2014.11); *H04N 19/182* (2014.11)

(56) References Cited

U.S. PATENT DOCUMENTS

| | | | |
|---|---|---|---|
| 8,520,742 B2 | 8/2013 | Shigeta et al. | |
| 8,744,203 B2* | 6/2014 | El-Maleh | H04N 19/186 382/251 |
| 8,928,686 B2 | 1/2015 | Messmer | |
| 9,224,363 B2 | 12/2015 | Ballestad et al. | |
| 9,615,096 B2* | 4/2017 | Lin | H04N 19/124 |
| 10,123,024 B2* | 11/2018 | Du | H04N 19/132 |
| 10,397,666 B2* | 8/2019 | Thomas | H04N 19/119 |
| 2008/0152245 A1 | 6/2008 | El-Maleh et al. | |
| 2010/0119157 A1* | 5/2010 | Kameyama | H04N 19/115 382/195 |
| 2012/0093427 A1 | 4/2012 | Itani et al. | |
| 2012/0213409 A1* | 8/2012 | El-Maleh | H04N 19/186 382/103 |
| 2012/0315011 A1 | 12/2012 | Messmer et al. | |
| 2013/0208784 A1 | 8/2013 | Pietila | |
| 2015/0208070 A1* | 7/2015 | Verzijp | H04N 19/46 375/240.02 |
| 2015/0358625 A1* | 12/2015 | Lin | H04N 19/124 375/240.24 |
| 2017/0041620 A1* | 2/2017 | Du | H04N 19/132 |
| 2017/0118540 A1* | 4/2017 | Thomas | H04N 21/2343 |

FOREIGN PATENT DOCUMENTS

| | | |
|---|---|---|
| JP | 2010-206751 A | 9/2010 |
| JP | 2015-507443 A | 3/2015 |
| WO | WO 2009/014156 A1 | 1/2009 |
| WO | 2010/146772 A1 | 12/2010 |
| WO | WO 2012/147018 A2 | 11/2012 |
| WO | WO 2015/008464 A1 | 1/2015 |

OTHER PUBLICATIONS

ITU-R, "Parameter Values for the HDTV Standards for Production and International Programme Exchange", Recommendation ITU-R BT.709, Apr. 2002, 32 pages.

ITU-R, "Parameter Values for Ultra-High Definition Television Systems for Production and International Programme Exchange", ITU-R Rec BT.2020, Aug. 2012, 7 pages.

ITU-T, "Advanced Video Coding for Generic Audiovisual Services", Series H: Audiovisual and Multimedia Systems, Infrastructure of Audiovisual Services—Coding of Moving Video, International Telecommunication Union (ITU), H.264, Nov. 2007, 564 pages.

ITU-T, "High Efficiency Video Coding", Series H: Audiovisual And Multimedia Systems, Infrastructure of Audiovisual Services—Coding of Moving Video, Apr. 2013, 317 pages.

Tourapis, H.264/14496-10 AVC Reference Software Manual JM16.1, Joint Video Team (JVT) of ISO/IEC MPEG & ITU-T VCEG (ISO/IEC JTC1/SC29/WG11 and ITU-T SG16 Q.6) 31st Meeting: London, UK, Jun. 28-Jul. 3, 2009, $31^{st}$ Meeting, London, UK, Jun. 28-Jul. 3, 2009, 90 pages.

Luthra et al., "Call for Evidence (CfE) for HDR and WCG Video Coding", ISO/IEC JTC1/SC29/WG11, Doc. W15083, Geneva, Switzerland, Feb. 2015, 46 pages.

Mann, Gavin, "4K Technology Is The Tipping Point in Sight?", Broadband, Journal of the SCTE, vol. 36, No. 3, Aug. 2014, 108 pages.

Morrison, Geoffrey, "High Dynamic Range Arrives at CES 2015", Available on internet https://www.cnet.com/news/high-dynamic-range-arrives/, Jan. 8, 2015, 10 pages.

SMPTE, "High Dynamic Range Electro-Optical Transfer Function of Mastering Reference Displays", ST 2084, Aug. 29, 2014, pp. 1-14.

SMPTE, "VC-1 Compressed Video Bitstream Format and Decoding Process", SMPTE 421M-2006, Feb. 24, 2006, 493 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Sullivan et al.,"Rate-Distortion Optimization for Video Compression", Signal Processing Magazine, IEEE, vol. 15, Issue 6, Nov. 1998, pp. 74-90.

Tech et al., "3D-HEVC Draft Text 7", JCT3V-K1001, 11th Meeting: Geneva, CH, Feb. 12-18, 2015, 123 pages.

Tsai et al., "Adaptive Loop Filtering for Video Coding", IEEE Journal of Selected Topics in Signal Processing, vol. 7, No. 6, Jul. 8, 2013, pp. 934-945.

SMPTE, "Derivation of Basic Television Color Equations", RP 177-1993 Reaffirmed 2002, Society of Motion Picture and Television Engineers, NY, US, Nov. 1, 1993, 5 pages.

* cited by examiner

Horizontal edge

Vertical edge

ARTISTIC INTENT BASED VIDEO CODING

CROSS REFERENCE TO RELATED APPLICATIONS

This application is a National Stage Entry under 35 U.S.C. § 371 of Patent Cooperation Treaty Application No. PCT/US2016/028597, filed Apr. 21, 2016, which claims priority to U.S. provisional patent application No. 62/150,831, filed Apr. 21, 2015, the disclosures of all of which are hereby incorporated herein by reference in their entireties.

BACKGROUND

Today, artistic intent including a meaning, reason, or idea an artist may wish to portray to his or her audience may be expressed, articulated, communicated, and/or the like in content (e.g. picture, video, audio, and/or the like). Such content may be encoded (e.g. compressed) to reduce storage and/or transmission bandwidth, for example, such that the content may be streamed and/or stored on physical media. Unfortunately, the coding may negatively impact (e.g. distort, de-emphasize, and/or the like) and/or even eliminate expressions of such artistic intent.

SUMMARY

Systems, methods, and instrumentalities are disclosed for artistic intent based content coding that preserves expressions of artistic intent in content. Expressions of artistic intent are identified (e.g. by signaling or content analysis) and expressed as a set of artistic intent positions $P_{ART}$ and artistic intent characteristics $C_{ART}$. Artistic intent characteristics $C_{ART}$ may be signaled and used to identify artistic intent positions $P_{ART}$. Artistic intent preservation coding and processing may be applied to sample positions $P_{ART}$ to preserve characteristics $C_{ART}$. A coding user interface may permit a user to specify an artistic set (e.g. $P_{ART}$ and/or $C_{ART}$) and to select and/or configure treatment of pixels and/or blocks associated with an artistic set, such as a fidelity enhancement, QP adjustment value and/or post processing. Content priority or importance levels may be impliedly and/or expressly indicated at fine (e.g. pixel, sample) and/or coarse (e.g. block) levels of content for varying (e.g. enhanced, reduced) levels of treatment in content coding, delivery, processing and/or error resilience/robustness.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

For example, video coding systems compress digital video signals to reduce storage and/or transmission bandwidth for digital video signals. There may be a variety of types of video coding systems, e.g., block-based, wavelet-based, object-based and block-based hybrid video coding systems. Further, there may be e a variety of block-based video coding systems, some of which may be based on international video coding standards. MPEG1/2/4 part 2, H.264/MPEG-4 part 10 AVC, VC-1, and H.265/HEVC (High Efficiency Video Coding) may be examples of block-based video coding systems based on international video coding standards. MPEG-2, H.264/AVC and HEVC standards were developed, for example, by ITU-T/SG16/Q.6/Video Coding Experts Group (VCEG) and ISO/IEC JTC1 SC29 WG11 Moving Picture Experts Group (MPEG). As described herein, coding may affect an artist's intent that he or she may have wanted to portray the content. For example, video coding systems may lighten a color of an object the artist may have wanted to be vivid so that it may stand out and, as such, the object may no longer stand out in the content after coding.

Figure 1:
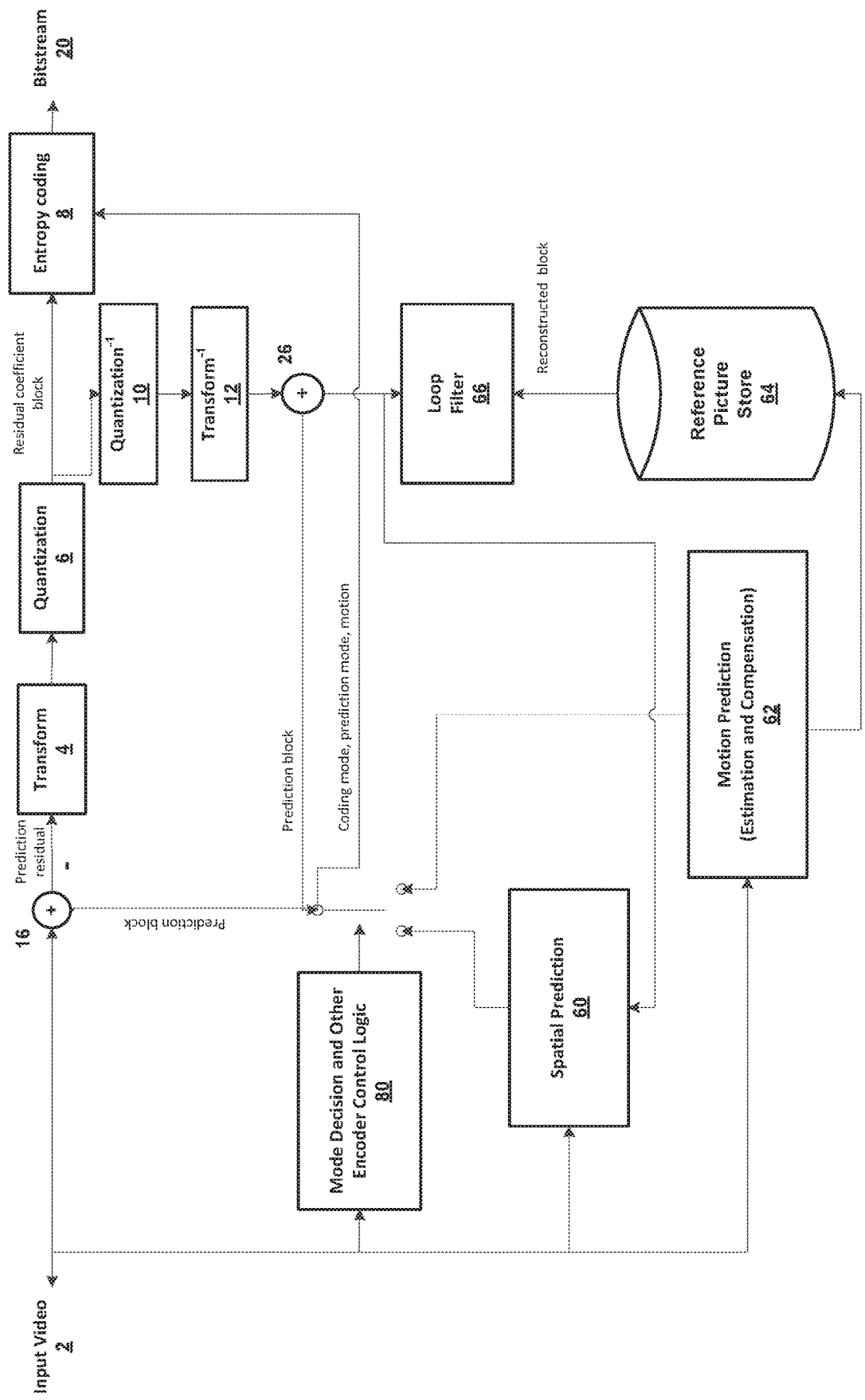
FIG. 1 is a diagram of an example of a block-based hybrid video encoder.

FIG. 1 is a diagram of an example of a block-based hybrid video encoder. Input video signal 2 may be processed, for example, block by block. A video block unit may include 16×16 luma samples and corresponding chroma samples, for example, in MPEG1/2/4 and H.264/AVC. The number of chroma samples may depend on the chroma format of an input video signal. Two 8×8 chroma blocks may correspond with one 16×16 block of luma samples, for example, when 4:2:0 subsampling is used. A coding block unit, e.g., a standard coding block unit, may be referred to as a macroblock (MB). An extended block size may be referred to as a "coding tree unit" (CTU). A CTU may be used, for example, to compress high resolution video signals, e.g., 1080 and higher resolution. A CTU may have various sizes, e.g., 64×64, 32×32 and 16×16 luma samples. CTU size may be, for example, selected at a sequence level and signaled in a Sequence Parameter Set (SPS). A CTU may be partitioned into coding units (CU), for example, via quad-tree splitting. An intra or inter prediction mode may be selected, for example, at a CU level. A CU may be partitioned into prediction units (PU). Separate predictions may be applied to PUs.

Figure 3:
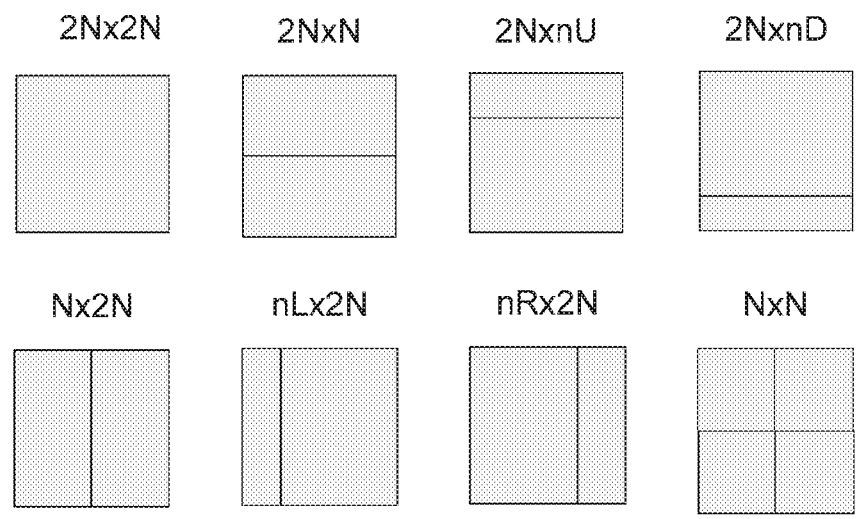
FIG. 3 is a diagram of prediction unit modes in HEVC.

FIG. 3 is a diagram of prediction unit (PU) modes or partitions of a CU in HEVC. Spatial prediction (160) and/or temporal prediction (162) may be performed for any one or more input video block (MB or CU).

Spatial prediction (referred to as "intra prediction") may predict a current video block, for example, by utilizing pixels from already coded neighboring blocks within a video picture/slice. Spatial prediction may reduce spatial redundancy in a video signal.

Temporal prediction (referred to as "inter prediction" or "motion compensated prediction") may predict a current video block, for example, by utilizing pixels from already coded video pictures. Temporal prediction may reduce temporal redundancy in a video signal. Temporal prediction for a given video block may be signaled, for example, by one or more motion vectors and one or more reference indices. Motion vectors may indicate an amount (e.g. magnitude or rate) and a direction of motion between a current block and a reference block. Reference indices may identify one or more reference pictures in a decoded picture buffer that one or more temporal prediction blocks conic from. An example of a decoded picture buffer is labeled "reference picture store 64" in FIG. 1.

Mode decision block 80 in the encoder shown in FIG. 1 may select (e.g. the best) prediction mode (e.g. intra mode or inter mode) and associated prediction information (e.g. luma and chroma prediction mode for intra coded or motion partitions, motion vectors and reference indices for inter coded). The selection may occur after spatial and/or temporal prediction.

Encoder mode decision logic may, for example, rely on rate-distortion optimization techniques to select a mode (e.g. best mode) to provide an optimal trade-off between distortion and rate. Distortion may be, for example, mean squared error between a reconstructed video block and an original video block. Rate may be, for example, a number of bits spent coding a block.

Summation block 16 may generate a prediction residual by subtracting a prediction block from a current video block. Transform 4 may transform the prediction residual. Quantization 6 may quantize the transformed prediction residual. Inverse quantization 10 may inverse quantize the quantized residual coefficients. Inverse transform 12 may inverse transform the inverse quantized residual coefficients. An alternative to inverse quantization 10 and inverse transform 12 is a transform skip mode. A transform skip mode at the Transform Unit (TU) level may bypass the transform stage and directly quantize prediction residuals of a TU block in the spatial domain. Another example or alternative to inverse quantization 10 and inverse transform 12 may a transform and quantization bypass mode. A transform and quantization bypass mode at the Transform Unit (TU) level may bypass the transform stage and the quantization stage.

Inverse quantization 10 and inverse transform 12 generate the reconstructed residual. Summation 26 generates the reconstructed video block by adding the reconstructed residual to the prediction block.

Loop filter 66 may apply in-loop filtering to the reconstructed video block. Reference picture store 64 may store the filtered reconstructed video block. The filtered reconstructed video block may be used to code future video blocks. Deblocking filters may be supported by, for example, H.264/AVC and HEVC. Deblocking filters are adaptive smoothing filters applied on block boundaries to reduce blocking artifacts due to different modes and/or parameters used to code two neighboring blocks. A non-linear in-loop filter, e.g., Sample Adaptive Offsets (SAO) filter, may be supported by, for example, HEVC. There are two types of SAO filtering: 1) Band Offsets (BO), which may reduce banding artifacts, and 2) Edge Offsets (EO), which may restore edges distorted, for example, during quantization. Other in-loop filtering methods, such as Adaptive Loop Filters (ALF), may be supported.

Entropy coding unit 8 generates output video bitstream 20. Coding mode (e.g. inter or intra), prediction mode information, motion information (e.g. motion vectors and reference indices), quantized residual coefficients, in-loop filtering parameters (e.g. EO and/or BO parameters) may be provided to entropy coding unit 8 for further compression and packing to generate bitstream 20.

Figure 4:
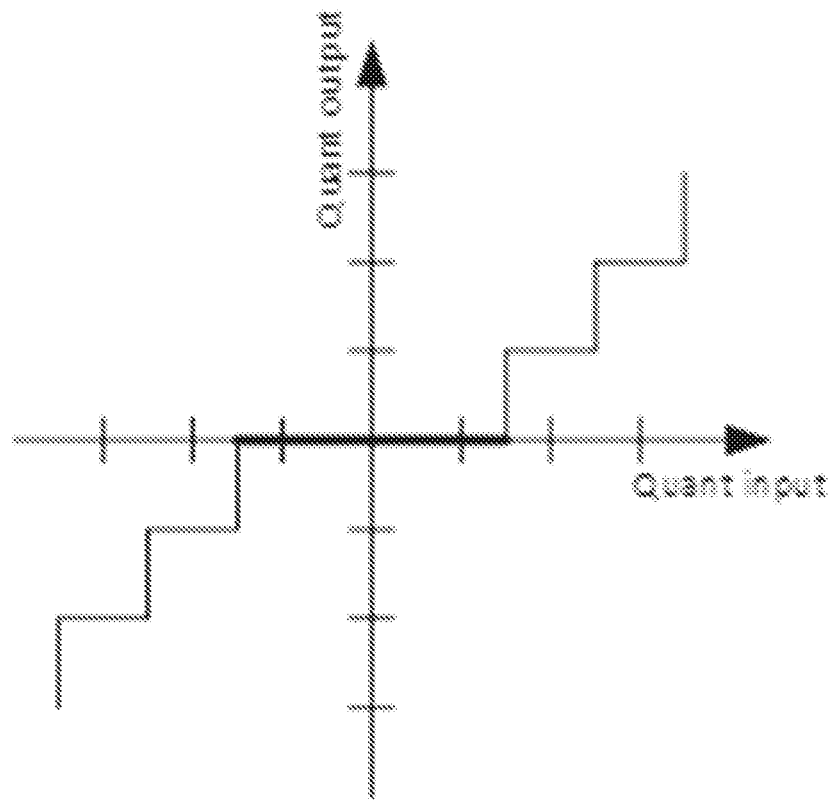
FIG. 4 illustrates an example of scalar quantization with a dead-zone.

FIG. 4 illustrates an example of scalar quantization with a dead-zone. Quantization 6 may introduce distortion during compression, for example, by quantizing with a dead-zone. The amount of distortion introduced during quantization may depend on the size of a dead-zone and a quantization step size. While a quantization process may introduce distortion, it may also significantly reduce the number of bits used to code video. A signal being quantized by a quantization process may be quantized to have the same value of quantization output within a certain range. For example, input values within a dead zone may have quantized output value equal to zero. Some codecs, e.g., H.264/AVC and HEVC, may use scalar quantization with a dead-zone. A dead-zone may be used to suppress transform coefficients and/or prediction residuals in the spatial domain with small magnitude. Different sizes of the dead zone may be used, for example, depending on the coding mode.

Figure 2:
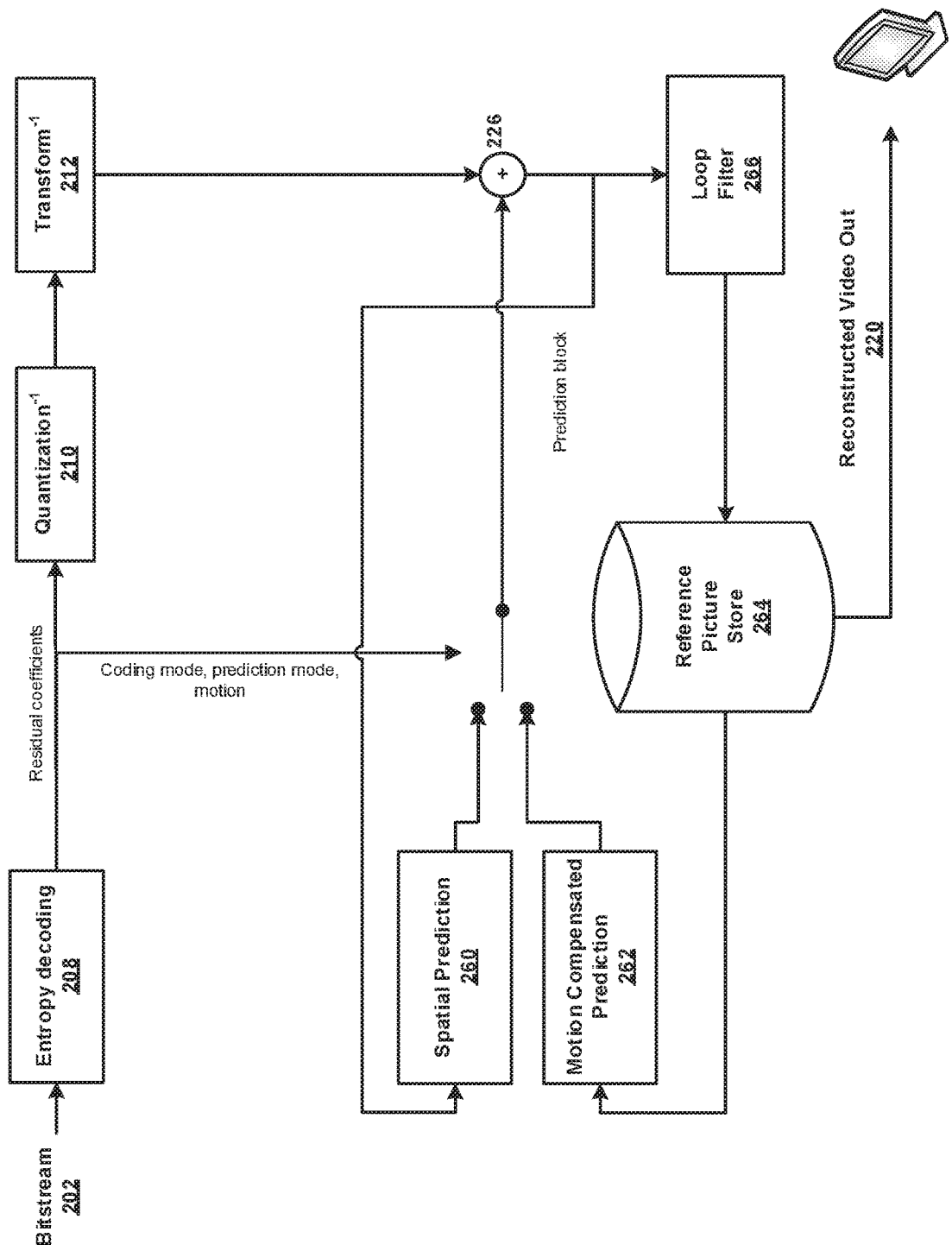
FIG. 2 is a diagram of an example of a block-based video decoder.

FIG. 2 is a diagram of an example of a block-based video decoder. FIG. 2 illustrates a block-based hybrid video decoder that may correspond to the encoder in FIG. 1. Entropy decoding unit 208 unpacks and entropy decodes video bitstream 202. The coding mode and associated prediction information may be provided to spatial prediction unit 260 (e.g. when intra coded) or temporal prediction unit (motion compensated prediction unit) 262 (e.g. when inter coded). Spatial prediction unit 260 or motion compensated prediction unit 262 may generate the prediction block.

Inverse quantization unit 210 and inverse transform unit 212 reconstruct the residual block from residual transform coefficients generated by entropy decoding unit 208. Summation 226 adds the prediction block and the reconstructed residual block to form the reconstructed block. The reconstructed block may be provided to in-loop filtering unit 266 and stored in reference picture store 264. Although not shown in FIG. 2, in-loop filtering parameters (e.g. EO and/or BO parameters) may be parsed from the bitstream and sent to in-loop filtering unit 266, for example, to control loop filtering operations. Reconstructed video in reference picture store 264 may be provided to drive a display device and/or to predict future video blocks.

Functional blocks in example system architectures shown in FIGS. 1 and 2 may be implemented using a variety of techniques with varying levels of sophistication and varying levels of coding efficiency. For example, bi-prediction, which is a form of temporal prediction, multiple reference pictures and deblocking filters, flexible block structures and SAO may be implemented. More sophisticated techniques may involve more computations at the encoder and decoder. However, more sophisticated techniques may provide significantly improved coding efficiency. In the evolution of video coding standards, a more recent generation of codec may be, for example, twice as efficient as a previous generation of codec. As an example, HEVC may deliver the same subjective video quality using, on average, less than half of the bit rate utilized by H.264/AVC.

The world is increasingly connected due to significant technological advances in wired and wireless network capacities. Smartphones, tablets, and other portable devices have increasing computing capabilities and faster network connections. These trends, together with the advancement in video compression technologies, have led to the ubiquitous presence of High Definition (HD) video across different market segments. HD video is offered in linear TV programs, TV broadcasting, subscription-based or ad-supported on-demand video streaming services (e.g. NetFlix, Hulu, Amazon, Google's YouTube), live streaming, and mobile video applications (e.g. user generated content, video recording, playback, video chats).

Video quality improvement continues beyond HD. Ultra High Definition (UHD) video technology may provide next generation video services with improved picture quality for consumers. There is significant interest in manufacturing and sales of UHD displays (e.g. 4K resolution TVs) and associated services, such as higher speed wired and wireless communication connections to receive and/or transmit UHD quality video anywhere, anytime.

A UI-ID video format has been formally defined in the Recommendation ITU-R BT.2020 and SMPTE ST 2036-1. UHD formats define enhanced parameters in several aspects of video signals. Table 1 provides a comparison between video parameters for HD and UHD. Compared to HD, UHD supports higher spatial resolutions (e.g. 3840×2160 and 7680×4320), higher frame rates (e.g. up to 120 Hz), higher sample bit depths (e.g. up to 12 bits for high dynamic range support) and a wider color gamut that enables the rendering of more vivid colors.

TABLE 1

Comparison of High Definition (HD) and
Ultra High Definition (UHD) video formats

| | | High Definition | Ultra High Definition |
|---|---|---|---|
| ITU-R BT series | | BT.709-5 (part 2) | BT.2020 |
| Spatial | | 1920 × 1080 | 7680 × 4320, 3840 × 2160 |
| Temporal | Frame rate Scan | 60, 50, 30, 25, 24 Progressive, interlaced | 120, 60, 50, 30, 25, 24 Progressive |
| Primary colors | Red primary | (0.640, 0.300) | (0.708, 0.292) |
| | Green primary | (0.150, 0.330) | (0.170, 0.797) |
| | Blue primary | (0.600, 0.060) | (0.131, 0.046) |
| | White point | | (0.3127, 0.3290) (D65) |
| | Coding format | 8- and 10-bit | 10- and 12-bit |

Figure 5:
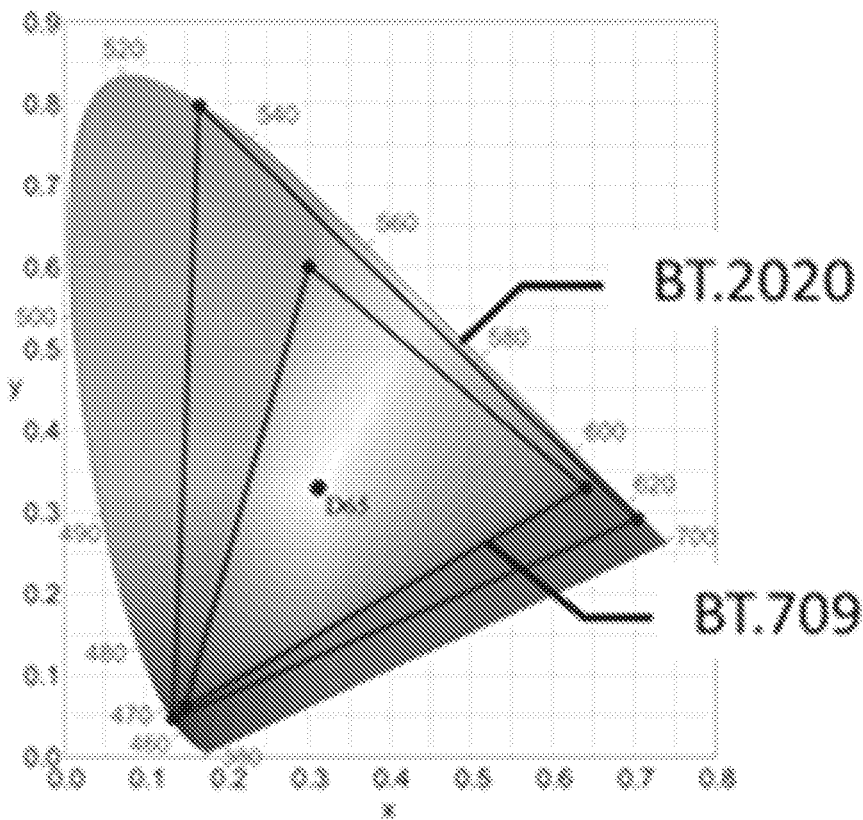
FIG. 5 illustrates a comparison of BT.709 and BT.2020 color gamuts.

FIG. 5 illustrates a comparison of BT.709 and BT.2020 color gamuts. FIG. 5 shows the HD color gamut (inner triangle) and the UHD color gamut (outer triangle) overlaid with the CIE 1931 color space chromaticity diagram (horseshoe shape). The horseshoe shape represents the range of visible colors to human eyes. The BT.709 color gamut and the BT.2020 color gamut cover about 36% and 76% of the CIE 1931 color space, respectively. In other words, compared to the color volume that may be reproduced on a BT.709 (HD) display, which has dominated the consumer display market for many years, the BT.2020 displays significantly increase the volume of reproducible colors. BT.2020 may provide much more vivid and richer colors to video consumers.

Figure 6:
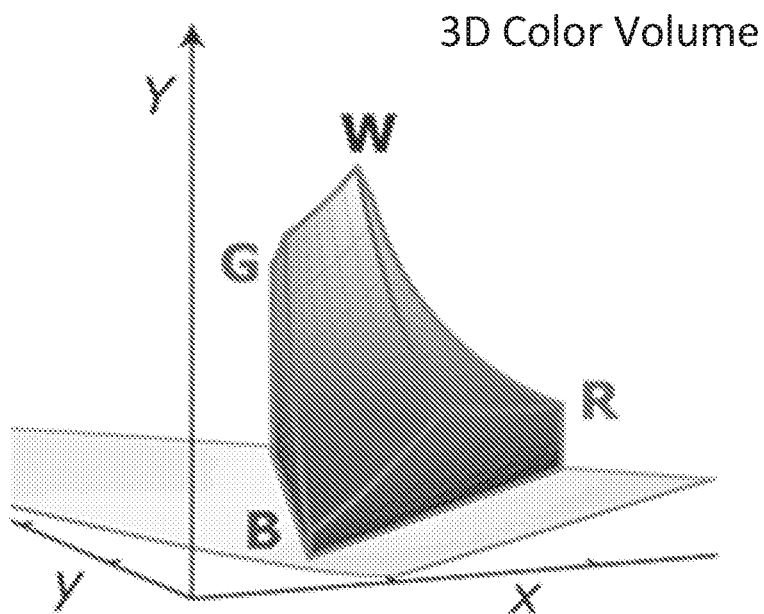
FIG. 6 illustrates 3D color volume with luminance along the Y axis and colors along x, y axes.

FIG. 6 illustrates 3D color volume with luminance along the Y axis and colors along x, y axes. The (x,y) plane corresponds to the CIE 1931 color space in FIG. 5. The vertical Y axis corresponds to the luminance (e.g. brightness) signal. The luminance signal is measured in cd/m$^2$ (candela per square meter), also referred to as nits (1 nit=1 cd/m$^2$). Dynamic range is the range of the luminance signal supported by a display. Many consumer displays support approximately 100 nits peak luminance. High Dynamic Range (HDR) displays (e.g. with peak luminance of approximately 1000 to 4000 nits) may provide significant perceptual quality benefits.

HDR support may involve significant modifications, e.g., an entire ecosystem change. HDR modifications may occur in capturing, content creation workflow, delivery and display. HDR is advancing to consumer deployment in view of compelling quality benefits of HDR video, such as Dolby Vision. In support of HDR display, display manufacturers have demonstrated HDR displays. In support of HDR content creation, a Perceptual Quantizer (PQ) standardized in SMPTE ST 2084. In support of HDR delivery, the Main-10 profile of HEVC may be used to compress HDR signals carried in the 10-bit Y'CbCr format using a BT.2020 container. There may be coding efficiency improvements over the HEVC Main-10 profile offering backward compatibility with Standard Dynamic Range (SDR) video.

In addition to video quality improvements provided by UHD and HDR video, 3D video offers enhanced video quality, 3D video production, delivery, and rendering research continue along with expansion of 3D content and elimination of special eyeware, such as 3D glasses. Autostereoscopic (glass-free) display technologies are developing to avoid eye fatigue, headaches, content aliasing due to reduced spatial resolution, etc. The number of views may be significantly increased, for example, to alleviate such problems. However, directly coding video samples in many views may have significant overhead costs. The use of a depth map and efficient inter-view prediction may be part of 3D video improvements, for example, to reduce the burden of 3D video production and delivery costs.

Figure 7:
FIG. 7 is a diagram of an example of a depth map.

FIG. 7 is a diagram of an example of a depth map. Depth maps are images with grayscale valued samples, where grayscale values may indicate the depth or distance of objects from viewers. A few camera captured views accompanied by high quality depth maps, for example, may permit a receiver/display to render objects at arbitrary view positions to create a desired 3D effect.

Figure 8:
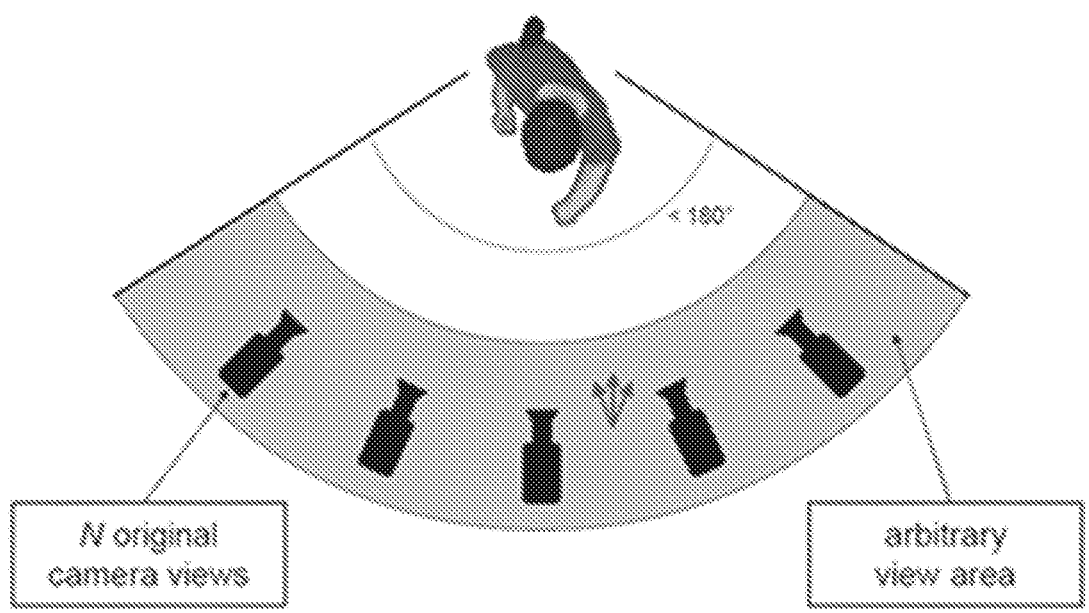
FIG. 8 is an example of generating arbitrary views using camera views.

FIG. 8 is an example of generating arbitrary views using camera views. FIG. 8 shows an example of generating arbitrary views using a fixed number of camera captured views and corresponding depth maps. Depth maps support arbitrary view rendering and may also support efficient compression of the camera captured views. As an example, an alternative to predicting a second camera view directly from a first camera view in FIG. 8 is a depth map used to project the first camera view to the position of the second camera view. A depth map may be used to provide more accurate prediction of the second camera view. An extension of the HEVC standard, i.e., 3D-HEVC, may utilize depth map and advanced view synthesis algorithms to increase compression efficiency and reduce the bandwidth used to deliver 3D video.

As described herein, advances in video production, delivery and rendering technologies, e.g., HDR, WCG, and depth-based 3D video, may provide content producers (e.g. directors, color artists and users creating user generated content) with a bigger "palette" (e.g. a wider set of video parameters and tools) to more freely and accurately express their artistic intent. As an example, a colorist may choose to apply especially vivid, saturated red colors to scenes with blooming flowers. A saturated red color may be available using the BT.2020 color space, but not the BT.709 color space (e.g., which may be the color space available or resulting from encoding). As such, in examples, artists may more faithfully render sunrise versus starlight in pictures, for example, using HDR. In the natural world, the luminance level of starlight is about $10^{-3}$ nits, whereas the luminance of sunlight is many orders of magnitude higher at about $10^5$ nits. A director or colorist working on 3D video may want to emphasize 3D objects that are at a particular distance (e.g. depth) from the audience or viewers. A director working in a spatial domain may choose to convey artistic intent by placing the main object in certain regions of a scene. As an example, a director may choose to place the leading actress' face on the right side of a picture. In examples, current techniques for coding may not provide the same emphasis and/or may cause a loss emphasis of the 3D objects and/or a position of an actress intended by the director and portrayed in the content prior to coding.

Figure 9:
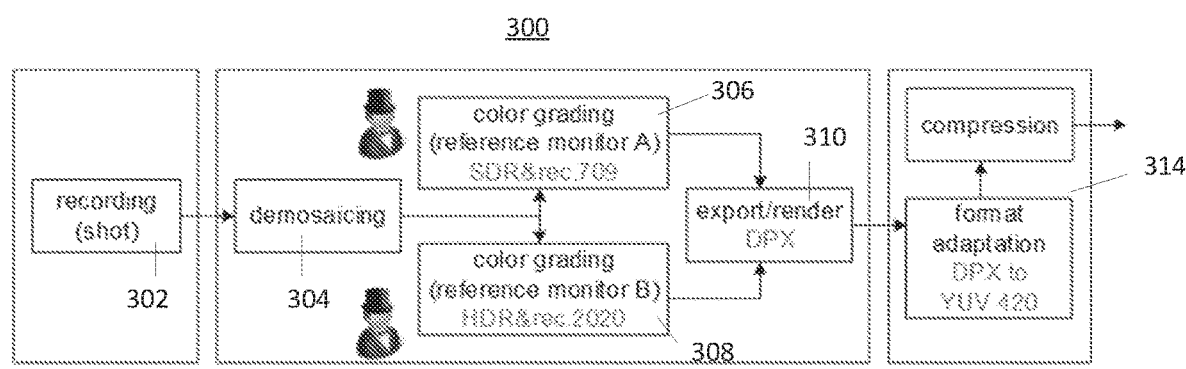
FIG. 9 is an example of content generation and content delivery workflow.

FIG. 9 is an example 300 of content generation and content delivery workflow. As shown, at 302, content may be recorded. The content may include audio, video, still images, and/or the like as described in examples herein. At 304, demosaicing may be applied to reconstruct a full color image from incomplete color samples output from an image sensor, for example, following capturing or recording at 302. A colorist may use a reference display to create images that express their artistic intent at 306 and 308, for example. A reference display may be an SDR display with Rec.709 color space (e.g., which the artist may interact with at 306) or an advanced HDR display with Rec.2020 color space (e.g., which the artist may interact with at 308). Regardless of display, a colorist may desire that rendered images represent their artistic intent (e.g., and may adjust the images using such displays at 306 and 308 to reflect or express such an intent). At 310, images may be exported and/or rendered into an appropriate format, such as a Digital Picture Exchange (DPX) format, which is a file format for digital intermediate and visual effects work standardized by SMPTE standard ST 268M-2003. The final functions in FIG. 9 may prepare professional studio content for delivery to consumers. In examples, preparations may comprise, for example, format conversion to a consumer format, e.g., conversion of DPX to YUV 4:2:0 at 312, and compression (e.g. coding) of consumer format video (e.g. YUV 4:2:0) to meet bandwidth requirements at 314.

In examples herein, artist intent may be expressed during content creation in the central functional blocks shown in FIG. 9 (e.g., in 304-310). A colorist may create a scene with different colors, for example, depending on the rendering device (e.g. display) at 306 and/or 308 and such a scene with the expression emphasis may be rendered at 310. As described herein, the artistic intent may include emphasis of an object, color, audio, and/or the like in the scene of the image. The scene included in the image with the artistic intent (e.g., the emphasis added) may be rendered or exported and may eventually be coded as described herein when converting to different formats (e.g., streaming, physical media, and/or the like). Unfortunately, such artistic intent may be lost during such coding using current techniques and/or methods. As such, systems, methods, and/or instrumentalities as described herein may be provided to preserve such emphasis (e.g., input and/or added at 304-310) during conversion and coding at 312 and 314, for example.

Figure 10:
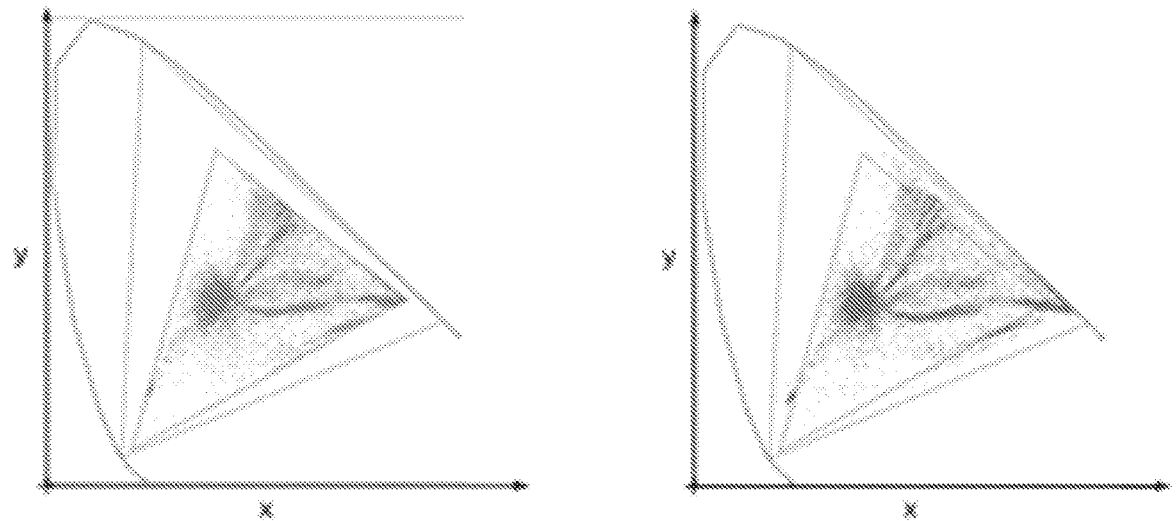
FIG. 10 is an example of content with different color grading on different reference displays.

FIG. 10 is an example of content with different color grading on different reference displays. As an example, content captured using a Sony F65 camera was graded on two different reference displays. Content on the left is graded on a rec.709 reference display while content on the right is graded on a DCI-P3 display. DCI-P3 is a color space wider than Rec. 709 but narrower than Rec. 2020. FIG. 10 shows the projection of the graded content on the xy chromaticity diagram, overlaid with the Rec.709 space (e.g., the smaller triangle in each set of axes) and the Rec.2020 space e.g., the larger triangle in each set of axes). A colorist would have more freedom with the reference display on the right, for example, because it is able to express (e.g. render) more colors.

It may be desirable during compression of graded content on the right side of FIG. 10 to preserve expression of artistic intent, for example, by ensuring that additional colors (e.g. colors outside the smaller Rec. 709 triangle) are not distorted. These colors may be sensitive to quantization during compression, which may make the final rendered colors (after decoding) on a target display appear more visibly different from the artistic intent.

Video coding standards, e.g., H.264 and HEVC, may be used to support preservation of aspects of original video content, e.g., expressed artistic intent. Film grain characteristics Supplemental Enhancement Information (SEE) messages in H.264 and HEVC may be used to improve preservation of film grains in original video content. Film grain is a noise-like signal that often exists in content originally captured using film. It may be referred to as "comfort noise," which some content creators use to preserve a desired "look and feel" in video (e.g. movies).

Artistic directors may prefer to preserve film grains even after video content has been digitized. Film grains in a digital video signal may pose a significant challenge to an encoder, for example, by generating a large amount of high frequency coefficients in the transform domain. Original film grain may be distorted and/or lost, for example, when an encoder quantizes these high frequency coefficients. An encoded bit rate may increase significantly, for example, when an encoder preserves these coefficients faithfully. Film grain SEI may specify a parameterized model for film grain synthesis. An encoder may remove the film grain from the original signal before encoding and use the film grain SEI to convey to the decoder how to regenerate the film grain and add it back to the video signal before display.

Coding tools, such as quantization matrices, may be used to preserve artistic intent in video content. A default quantization/de-quantization in H.264 and HEVC may apply a fixed scalar quantizer to one or more frequency components of transformed residual coefficients. Quantization matrices may be specified for a video sequence or a video picture (e.g. using Sequence Parameter Set or Picture Parameter Set), for example, to improve subjective quality. Different values of scalar quantizers may be applied to different frequency components in the transform domain. Specification of quantization matrices may be limited, and may address one specific function block such as quantization and de-quantization in the video coding system in FIG. 1 and FIG. 2. A film grain SEI message may be optional and may be additional information a decoder may discard. In other words, in examples, an ability to preserve artistic intent may be limited.

Coding tools may be used to preserve signal fidelity, improve subjective quality and/or remove coding artifacts. Coding tools, e.g., block level Quantization Parameter (QP) adjustment, deblocking filter, Sample Adaptive Offset (SAO) may be applied at the block level. Block level QP adjustment may permit QP values (e.g. the amount of quantization applied) to be changed, for example, among neighboring blocks. Block level QP adjustment may be used to control the quality of a block independently of another block. Differing QP adjustment may be applied to luma and chroma color components. Syntax elements may be signaled as part of the Transform Unit (TU) syntax structure, e.g., in HEVC, for example, to indicate delta QP(s) to be applied to a current Coding Unit (CU). Different block sizes may be selected to code an area where artistic intent is expressed, for example, depending on the encoder's mode decision logics (block 180 in FIG. 1).

A region with artistic intent expressed, e.g., a region with artistic expression, may have irregular shape. Alternate shapes may be used to represent and preserve artistic expression for irregular shapes. Video coding techniques may be used to facilitate preservation of artistic intent, which may be implicitly or explicitly expressed in content. Artistic intent may be identified at a fine granularity, e.g., samples may correspond with artistic intent. Artistic intent may be identified and preserved at a sample level (e.g. pixel level) without incurring significant signaling overhead. Coding tools may be originally designed or modified to preserve artistic intent in coded content.

Systems, methods, and instrumentalities are disclosed for artistic intent based content coding that preserves expressions of artistic intent in content. Expressions of artistic intent are identified (e.g. by signaling or content analysis) and expressed as a set of artistic intent positions $P_{ART}$ and artistic intent characteristics $C_{ART}$. Artistic intent characteristics $C_{ART}$ may be signaled and used to identify artistic intent positions $P_{ART}$. Artistic intent preservation coding and processing are applied to sample positions $P_{ART}$ to preserve characteristics $C_{ART}$. A coding user interface (e.g., which may include a graphical user interface) may permit a user to specify an artistic set (e.g. $P_{ART}$ and/or $C_{ART}$) and to select and/or configure treatment of pixels and/or blocks associated with an artistic set, such as a fidelity enhancement, QP adjustment value and/or post-processing. Content priority or importance levels may be impliedly or expressly indicated at fine (e.g. pixel, sample) or coarse (e.g. block) levels of content for varying (e.g. enhanced, reduced) levels of treatment in content coding, delivery, processing and/or error resilience/robustness.

For example, as described herein, artists and the film industry may not have control over compression technologies that may be used to compress theater quality films into other formats such as DVDs, Blu-Rays, digital content, and/or the like. Further, there are not suitable techniques available for an artist to provide information that may be used during such compression encoding and decoding) to interpret the film (e.g., that may be used to interpret expressions and/or enhancements an artist may make to objects, colors, and/or other items in the film. According to examples, such systems, methods, and/or instrumentalities may enable information or metadata (e.g., characteristics for each pixel such as $C_{ART}$) that may indicate an artist's intent to be added to objects, colors, and/or other items on a pixel level). Further, in such systems, methods, and/or instrumentalities the information or metadata that may indicate the artist's intent may be tied to the compression process i.e. it may be encoded during compression and decoded during playback as described herein.

In examples herein, to preserve artistic intent including providing such metadata or information, high quality content such as lossless content may be provided to an artist or other user. The artist or user may interact with an interface such as graphical user interface to adjust how the content may look in a compressed format such as Blu-Ray. The artist or user may use tools that may be associated with actions, functions, methods, and/or the like provided via the interface to specify what parts or portions of the content to treat differently or adjust in the content. The artist or user may visually see the results of such adjustment to the pixels in the user interface.

After selecting the pixels or portion of the content to treat differently, the artist or user may use the tools to indicate how to treat or adjust the pixels or portions differently during conversion i.e. whether to blur, increase a color, and/or the like as described herein. In examples, at this stage (e.g., using the tools to adjust or indicate how to treat the pixels differently), the artist or user may use the user interface and its tools to turn down a quantization step size so more bits flow to the selected pixels or portion of the content which may as a result be in higher fidelity, may adjust how the loop filter is applied to the selected pixels or portion of the content, and/or may perform any other suitable adjustment, enhancement, or modification to treat the selected pixels or portion of the content differently.

In examples, (e.g., after selecting the pixels and making adjustments thereto, coding parameters may be linked to a compression process. For example, the content with the adjustments of the pixels may be fed into an encoder such that the encoder may take into account the characteristic set (e.g., the enhancements, adjustments, etc. for the selected pixels) for the selected pixels (e.g., the pixel set) and encode such characteristic set and pixels (e.g., that may be part of metadata) into a bitstream. This may enable the decoder to know the pixels to adjust and/or enhance (e.g., the characteristic set and/or pixel set) and how to treat them differently (e.g., rules or modifications of encoding tools to treat them differently) so the decoder can interpret such information and operate accordingly.

As described herein, artistic intent may be expressed in a picture and/or sequence of pictures, for example, by characteristics. Examples of expressing artistic intent by characteristics are grading (e.g. modifying or enhancing) samples, e.g., based on colors (e.g. chromaticity), luminance values, depth values (e.g. for 3D content), texture properties, audio values, audio properties and association to objects in a scene. Examples of expressing artistic intent by characteristics are placing objects in spatial location(s), applying sound or audio effects to objects of interest and applying video and audio effects (e.g. fade in/fade out).

Sample values at position (x, y) may be denoted as S(x, y). Samples may comprise a triplet of color component values and/or other values (e.g. depth or audio) associated with a position. A characteristic of S(x, y) may be denoted as C(S(x, y)). A characteristic may, for example, correspond to one or more of a specific part of a chromaticity diagram (e.g. saturated red flowers), a specific part of the 3D color volume (e.g. moonlight), a given range of depth values (e.g. a moving object closest to the audience), a spatial region of video pictures, etc.

Artistic intent may be represented by a set of characteristic values denoted as $C_{ART}$. $C_{ART}$ may have discrete values, for example, a set of K values $C_{ART} = \{C_0, C_1, \ldots C_{K-1}\}$. Spatial locations may be expressed by a set of discrete coordinates, for example, when a characteristic corresponds to a spatial location of the samples in digital video. $C_{ART}$ may cover a range of continuous values. A characteristic may be expressed with floating point precisions, for example, when the characteristic corresponds to a part of the chromaticity diagram. A sample position (x, y) may be defined as an artistic intent position, for example, when a characteristic of the sample located at position (x, y) belongs to artistic intent set, $C(S(x, y)) \in C_{ART}$.

A collection of artistic intent positions in content may be denoted as $P_{ART} = \{(x, y) | C(S(x, y)) \in C_{ART}\}$. A position that is not an artistic intent position may be referred to as a regular position. Portions of content having expressed artistic intent, e.g., as indicated by $P_{ART}$, may be preserved with high fidelity (e.g. higher fidelity than other portions of content) and image quality. Coding and processing tools may be originally designed and/or modified to preserve and/or process samples located at $P_{ART}$.

Figure 11:
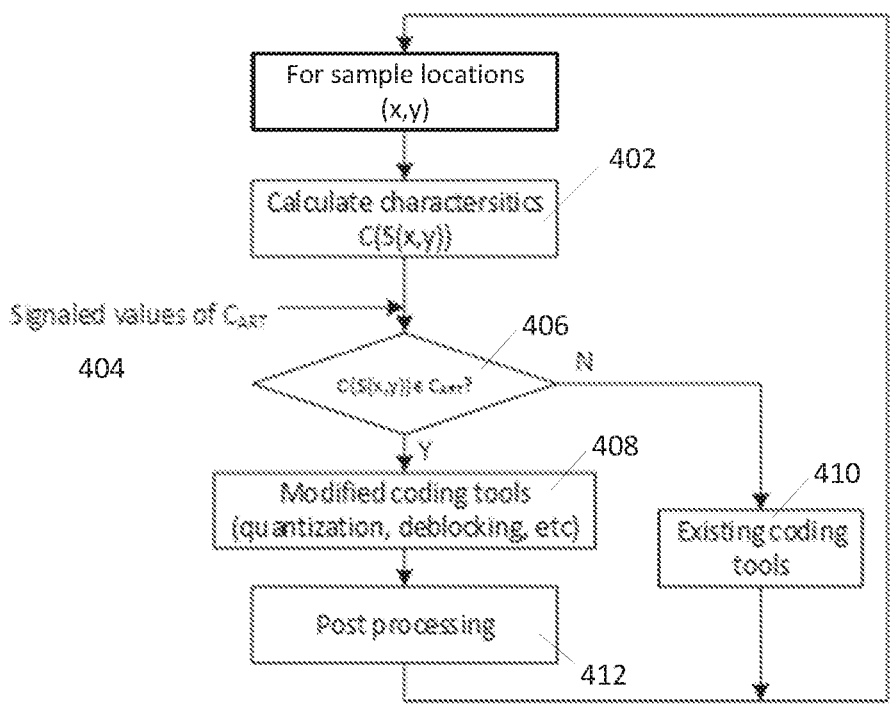
FIG. 11 is an example flow chart of artistic intent based video coding.

FIG. 11 is an example flow chart of artistic intent based video coding. In an example shown in FIG. 11, a characteristic value C(S(x, y)) may be determined (e.g. calculated) for sample positions (x,y), for example, based on or of sample values of S(x, y) or pixels at the sample positions (e.g., at 402). A sample value, S(x, y) may be a generic value or pixel, for example, corresponding to one or more (Y,U,V) components and/or one or more other values associated with a position (e.g. depth value, audio value, audio property, values associated with surrounding positions (e.g. positions in a local area around position (x,y)).

A determination may be made whether a sample position (x,y) belongs to $P_{ART}$ (e.g., as part of 406). The determination may be denoted as $(x,y) \in P_{ART}$. The determination may be made for one or more sample positions. A determination may be made, for example, by explicitly signaling artistic intent positions $P_{ART}$. Signaling may be provided for one or more pictures in a sequence of pictures. Explicitly signaling artistic intent positions $P_{ART}$ may incur high signaling overhead. In another embodiment, a set of characteristic values $C_{ART}$ corresponding to artistic intent may be explicitly signaled (e.g., at 404). Artistic intent sample locations $P_{ART}$ may be identified, for example, based on one or more of signaled values of $C_{ART}$ and the calculated characteristic value C(S(x, y)), which may permit identification of the locations of $P_{ART}$ with minimal signaling overhead (e.g., as part of 406). For example, a determination may be made as to whether a characteristic of a sample located at position (x, y) may be part of or match (e.g., belongs to) the artistic intent set, for example, $C(S(x, y)) \in C_{ART}$. That is, in an example, if or when a calculated characteristic value C(S(x, y)) for a sample located at position (x,y), may be part of, included in, or belong to (e.g., may match) a characteristic included in the set of characteristic values $C_{ART}$ signaled that correspond to artistic intent, the position (x,y) may indicate a location of artistic intent positions $P_{ART}$ (e.g., it may indicate a location of a pixel or sample to which artistic intent and/or the characteristic values thereof may be applied).

Artistic intent preservation coding tools and post processing may be applied (e.g., at 408 and 412), for example, to sample positions having expressed artistic intent, e.g., as indicated by $P_{ART}$. Non-artistic intent preservation coding tools and post processing may be applied, for example, to sample positions without expressed artistic intent (e.g., 410). For example, an indication of the sample position and the characteristic from the set of characteristic values configured to be applied to the sample position may be output (e.g., to the respective coding tools and/or post-processing tools) and/or signaled or sent to apply the artistic intent as described herein.

As described herein, artistic intent positions may be identified in content based on a characteristic set $C_{ART}$. A decoder may not have original sample values S(x, y), for example, when quantization (with or without transform) introduces loss during compression. Artistic intent samples may be identified, for example, using sample values available at both the encoder and the decoder. This may permit the encoder and the decoder to remain synchronized for artistic intent samples.

In an example, an encoder and decoder may, for example, use predicted samples (e.g. samples that belong to "prediction block" in FIGS. 1 and 2) to calculate sample characteristics and determine whether they belong to $P_{ART}$ (e.g., at 402 and 406, for example). Predicted samples may come from intra prediction (spatial prediction 60, 260) or inter prediction (motion prediction 62, 262). Predicted samples at position (x, y) may be denoted as $\hat{S}(x, y)$. Sample characteristics (e.g., using predicted samples) may be denoted as $C(\hat{S}(x, y))$. In other words, $(x, y) \in P_{ART}$ When $C(\hat{S}(x, y)) \in C_{ART}$ as described herein (e.g., above at 402 and 406). Thus, in examples, the samples values and/or locations used to calculate the characteristics (e.g., at 402) that may be compared to a received characteristics set to determine (e.g., at 406) whether the sample value may belong to or be included in an artistic intent sample value may include or may be the predicted samples.

In an example, predicted samples may be filtered, denoised, and/or otherwise processed to improve accuracy. A difference between predicted sample values and original sample values may be substantial, which may result in calculation of an inaccurate characteristic value of $C(\hat{S}(x, y))$. In an example, reconstructed sample values before loop filtering, such as the output of summation 26 or summation 226) may be used to determine a characteristic of artistic intent expression. Loop filter (e.g. 66 or 266) processes may use reconstructed sample values to determine artistic intent expression. A reconstructed sample before loop filtering at position (x, y) may be denoted as $\tilde{S}(x, y)$. A characteristic of $\tilde{S}(x, y)$ may be denoted as $C(\tilde{S}(x, y))$. In other words, $(x, y) \in P_{ART}$ when $C(\tilde{S}(x, y)) \in C_{ART}$.

Loop filtering may be adapted to preservation of expressions of artistic intent. For example, a determination whether a current position (x,y) belongs to $P_{ART}$ (e.g., at 406) may be made after in-loop filters are applied. Reconstructed samples after loop filtering may be used to calculate sample characteristics and characteristic values C (e.g., at 402). A reconstructed sample after conventional loop filtering at position (x, y) may be denoted as $\bar{S}(x, y)$. A characteristic of $\bar{S}(x, y)$ may be denoted as $C(\bar{S}(x, y))$. In other words, $(x, y) \in P_{ART}$ when $C(\bar{S}(x, y)) \in C_{ART}$ as described herein (e.g., above at 402 and 406). Thus, in examples, the samples values and/or locations used to calculate the characteristics (e.g., at 402) that may be compared to a received characteristics set to determine (e.g., at 406) whether the sample value may belong to or be included in an artistic intent sample value may include or may be the reconstructed samples.

Post processing may be applied to samples that belong to $P_{ART}$. A reconstructed sample after modified loop filtering at position (x, y) may be denoted as $\overline{S}(x, y)$. As described herein (e.g., above), such a reconstructed sample (e.g., after modified loop filtering) may be the sample used to calculate the characteristic at 402 and may be used to determine whether it may be included in the artistic intent position or values at 406). A characteristic of $\overline{S}(x, y)$ may be denoted as $C(\overline{S}(x, y))$. A refined set of artistic intent positions $\overline{P}_{ART}$ may be calculated, for example, when $C(\overline{S}(x, y)) \in C_{ART}$. A refined set of positions $\overline{P}_{ART}$ may be used during post processing of artistic intent samples. Calculating $\overline{P}_{ART}$ this way may improve accuracy of $P_{ART}$.

A set of artistic intent characteristic values $C_{ART}$ may be signaled. Signaling may be used, for example, to identify the artistic intent positions $P_{ART}$ as described herein. One or more characteristics in $C_{ART}$ represent one or more types of artistic intent to be preserved. Characteristics may be, for example, one or more of chromaticity, luminance, depth, spatial location, edge properties, texture properties, audio samples and audio effects or properties. Values for various types of characteristics representing various types of expression of artistic intent may be calculated by various techniques.

Chromaticity may be a type of artistic intent. A chromaticity characteristic value may correspond, for example, to the xy chromaticity diagram in FIG. 5. A chromaticity characteristic value may be calculated, for example, by converting a sample value S(x, y) from its current color space (e.g. YCbCr or RGB color space) to a CIE XYZ or other color space. A sample value may be, for example, one of $\hat{S}(x, y)$, $y)$, $\tilde{S}(x, y)$, $\overline{S}(x, y)$ or $\overline{S}(x, y)$ as previously discussed. For example, the RGB to XYZ color space conversion may be performed according to Eq. 1:

$$\begin{bmatrix} X \\ Y \\ Z \end{bmatrix} = \begin{bmatrix} X_r & X_g & X_b \\ Y_r & Y_g & Z_b \\ Z_r & Z_g & Z_b \end{bmatrix} \begin{bmatrix} R \\ G \\ B \end{bmatrix} \quad \text{Eq. 1}$$

In Eq. 1, the 3×3 matrix represents measured CIE tri-stimulus values for three channels (red, green and blue). For example, Xr, Yr, Zr represent measured CIE tri-stimulus values for the red channel. The 3×3 matrix may comprise different coefficients, for example, depending on the white point and different versions of RGB color space. YCbCr to CIE XYZ color space conversion may also be performed using a 3×3 matrix.

XY chromaticity values may be calculated from XYZ tri-stimulus values according to Eq. 2 and Eq. 3:

$$x^c = \frac{X}{X+Y+Z} \quad \text{Eq. 2}$$

$$y^c = \frac{Y}{X+Y+Z} \quad \text{Eq. 3}$$

Values $x^c$ and $y^c$ represent a sample's chromaticity characteristic. The values may be denoted as $x^c$-$y^c$ (instead of x-y) to differentiate from the notation for sample position (x,y).

Chromaticity characteristic values may be specified in the CIE XYZ color domain or other color spaces. For example, a range or set of chroma values may be specified in the YCbCr color space, the RGB color space, or in any color space in which video content is processed or encoded.

Luminance may be a type of artistic intent. A luminance characteristic value may correspond, for example, to the vertical Y axis in FIG. 6. Luminance may be calculated, for example, by converting a sample value S(x, y) from its current color space (e.g. YCbCr or RGB color space) to a CIE XYZ color space. A sample value may be, for example, one of $\hat{S}(x, y)$, $\tilde{S}(x, y)$, $\overline{S}(x, y)$ or $\overline{S}(x, y)$ as previously discussed. A luminance value may be set to the Y value of the XYZ tri-stimulus values.

There may be a variety of types or subtypes of luminance characteristics that individually or collectively express artistic intent, e.g., magnitude of luminance, gradient of luminance (e.g. contrast). Calculations of luminance characteristic values may vary, for example, depending on the type or subtype of luminance characteristic, e.g., calculation of a magnitude value may be different than calculation of a contrast value.

Depth may be a type of artistic intent. A depth characteristic value may be set, for example, to the depth value at location (x, y) in the corresponding depth map. A depth characteristic may be denoted as d(x,y). A corresponding depth map may be coded, e.g., compressed. An original depth value d(x,y) may not be available at the decoder. A value of a depth characteristic may be set to a coded depth value, which may be denoted as d(x, y).

A spatial location may be a type of artistic intent. A spatial location characteristic value may be set to a sample position (x, y).

Edge and/or texture properties may be a type or types of artistic intent. A local texture or edge based characteristic value may be set, for example, based on processing values (e.g. one or more of luma and chroma component values) in a local area surrounding a given location (x,y).

In an example, an edge detection algorithm may be applied to a local area comprising (e.g. centered on) location (x,y). A characteristic value may be set, for example, to an output of the edge detection algorithm. A characteristic value may be set, for example, to a binary value indicating the presence or absence of an edge. A characteristic value may be set, for example, to an edge strength or confidence value computed using one or more edge detection algorithms.

In an example, one or more oriented edge detection filters may be applied to determine whether position (x,y) is associated with an edge having a particular orientation. A characteristic value may be set, for example, to indicate one or more oriented edge orientations or detection filters that correspond to the location (x,y). For example, horizontal and/or vertical edge detection filters may be employed to determine whether location (x,y) is along a predominantly horizontal or vertical edge feature. A characteristic value may be set, for example, to indicate a horizontal edge (or edge strength) and/or a vertical edge (or edge strength). A position (x,y) may be associated with multiple characteristic values corresponding to edge detection results or edge strength measurements at different orientations.

In an example, one or more texture classification algorithms may be applied to a local area centered on location (x,y). A characteristic value may be set to an output of the texture classification algorithm. A characteristic value may be set to a statistical property of the local area surrounding position (x,y). For example, a characteristic value may be set to the average or variance of one or more component values in a local area surrounding (x,y). A characteristic value may be set based on correlation between pixels in the local area surrounding position (x,y). A characteristic value may be set to the output of a 1-D or 2-D filter applied at position (x,y).

A 1-D or 2-D filter may be designed to produce a result in response to one or more texture properties. A filter may be a 2-D Gabor function at a particular scale and frequency. A characteristic value may be set, for example, based on computing and processing a frequency domain representation of the local area surrounding position (x,y). Local area pixels may be transformed, for example, using a DCT or other suitable frequency transform. Values of a subset of frequency domain coefficients may be combined, for example, to create an energy measure for specific frequencies or a range of frequencies. Combination may, for example, comprise a simple or weighted additive combination. A characteristic value may indicate whether there is significant energy in some portion of 1-D or 2-D frequency space.

A local texture or edge based characteristic value may be computed, for example, using one or more of the components or values associated with a local area about location (x,y). For example, one or more of a luminance value or one or more chrominance values or components may be used to compute a texture or edge characteristic value.

Audio effect may be a type of artistic intent. An audio effect characteristic value may be set to or calculated using one or more audio values associated with position (x, y). The audio value may be coded.

As an example, an audio track comprising audio samples may be associated with an object or region of interest. A region of interest may be, for example, a human speaker, an approaching train, an explosion, etc., as represented in audiovisual content. Position (x,y) associated with audible artistic intent may be associated with an audio track and/or audio samples. Regions of interest may overlap. A position (x,y) may be associated with multiple audio tracks. Multiple audio tracks may be combined (e.g. additively) to form an audio representation for a position (x,y). A position (x,y) in a video frame may be associated with audio samples and/or related audio properties.

Associated audio samples or audio properties may be processed to determine whether position (x,y) is part of a characteristic set. As an example, a volume of one or more channels of an audio signal associated with position (x,y) may be obtained. Artistic intent may be deemed to be expressed, for example, when volume is above (or below) a threshold or within a range. Artistic intent may be deemed to be expressed, for example, based on detection of audio fade in/fade out. A gradient of volume may be calculated to detect audio fade in (e.g. in a positive volume gradient) or audio fade out (e.g. in a negative volume gradient). Artistic intent may be expressed, for example, when audio content occupies a certain range of audio frequencies. For example, a computed value of energy above or below a cutoff frequency or of energy within a certain frequency band may be determined to be above a threshold indicating an expression of artistic intent.

One or more channels of an audio signal accompanying a video signal may be coded (e.g. compressed). An encoder and decoder may use a compressed audio signal to calculate an audio characteristic value.

Expressions or characterizations of artistic intent are not limited to examples presented herein.

A characteristic value may be represented in the form of a scalar or a vector (e.g. two or more scalar components). For example, a chromaticity characteristic and a spatial location characteristic may be two-dimensional. A corresponding range of two-dimensional characteristics $C_{ART}$ may specify a two-dimensional shape, for example. A two-dimensional range may have an arbitrary shape. A polygon approximation may be applied, for example, to specify a range for an arbitrary shape.

Figure 12:
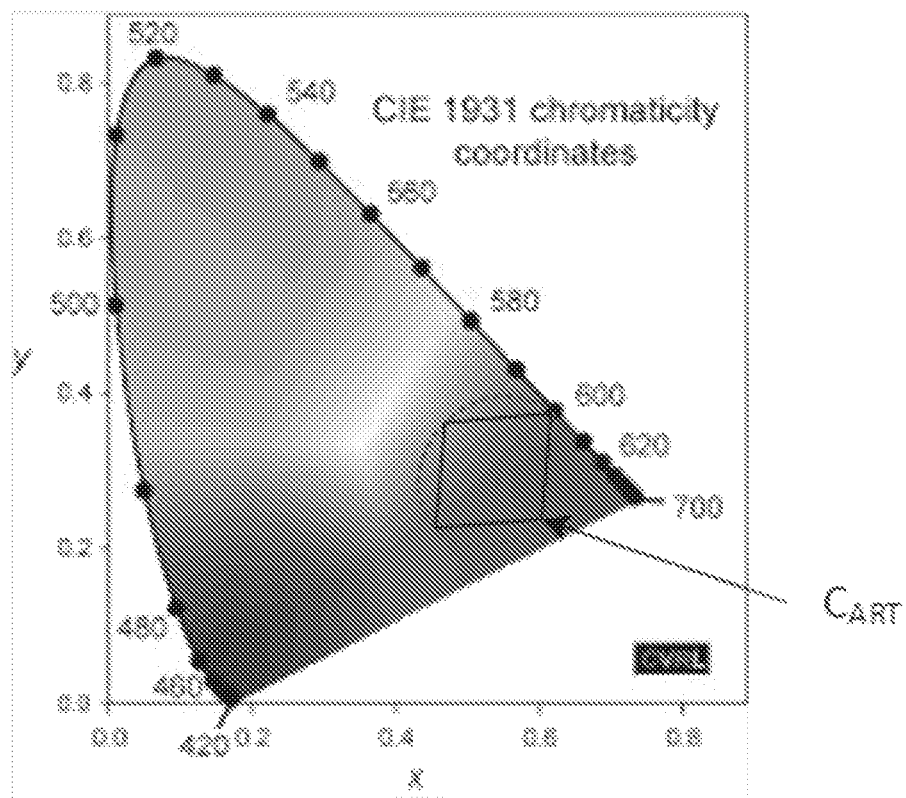
FIG. 12 is an example of a two-dimensional $C_{ART}$ shape approximated using a polygon.

FIG. 12 is an example of a two-dimensional $C_{ART}$ shape approximated using a polygon. FIG. 12 shows an example of specifying an oval-shaped $C_{ART}$ region on a chromaticity diagram. A polygon (shown by solid line) may be used to approximate an oval shape (shown by dashed line), for example. Approximating an arbitrarily shaped $C_{ART}$ using one or more polygon and/or other shape representation may provide advantages.

A polygon may approximate a shape with increased precision with increased number of vertices/sides. A polygon may be signaled, e.g., by specifying the number of vertices/sides and the coordinate values of the vertices. Determining whether a given point is inside a polygon may reduce time to determine whether $(S(x, y)) \in C_{ART}$. Whether a point is inside a polygon may be decided, for example, by representing the polygon with a finite number of triangles and determining whether a point is inside any of the triangles.

A 2-dimensional $C_{ART}$ may be specified using a polygon approximation with N vertices and coordinates for the N vertices. The value N may be chosen, for example, by an encoder. Selections may depend, for example, on a desired trade-off between accuracy of polygon approximation and signaling overhead. $C_{ART}$ may be specified with two end point values, for example, when a characteristic is one-dimensional. $C_{ART}$ may be specified using a depth range $(d_{min}, d_{max})$, for example, when a characteristic is depth. $C_{ART}$ may be specified using a luminance range $(L_{min}, L_{max})$, for example, when a characteristic is luminance. Some signaled parameters may have floating point precision. As an example, luminance range values or coordinates on an xy chromaticity diagram may be floating point numbers. Fixed-point approximation of floating point values may be signaled. Precision of fixed point approximation (e.g., number of bits used) may be signaled as part of $C_{ART}$ signaling. $C_{ART}$ may be specified, for example, using a range of values or an area representation (e.g. polygon), which may specify one or more characteristics in a set of characteristic values.

Combination of two or more types of characteristics may be supported. Different types of characteristics may be orthogonal to each other. As an example, $C_{ART}$ may comprise M member (e.g., orthogonal) characteristics, $C_{ART} = \{C^0, C^1, \ldots C^{M-1}\}$. The collective range of $C_{ART}$ may be signaled by separately specifying the range of individual member characteristics. For example, artistic intent may be expressed within a range of chromaticity and a range of luminance. This may be represented by M=2, $C_{ART} = \{C^0, C^1\}$, where $C^0 = C_{ART}^{ch}$ (chromaticity characteristic), and $C^1 = C_{ART}^{l}$ (luminance characteristic). $C_{ART}$ parameters may specify $C^0 = C_{ART}^{ch}$ (e.g. using a polygon approximation to specify a region of chromaticity values) and may specify $C^0 = C_{ART}^{l}$ (e.g. using two end points to specify a range of luminance values).

Member characteristics may be combined, for example, when member characteristics are not orthogonal to each other. For example, chromaticity and luminance may be combined together to define a 3D range in a 3D color volume diagram, such as the diagram shown in FIG. 6. A 3D range may be signaled, for example, by signaling the surface of a 3D shape. A decision may be made whether a point with (x,y,z) coordinates lies within the 3D shape.

As an example of a combination of two or more types of characteristics, assume $C^0$ represents a spatial region of interest that may be represented, for example, as a polygon region in the spatial/pixel domain. Assume that $C^1$ represents a region of XY chromaticity space that may be represented, for example, as a polygon region in XY chromaticity space. $C_{ART} = \{C^0, C^1\}$ may represent pixels (e.g. all pixels) in the spatial region defined by $C^0$ which may have chroma components residing within the chromaticity region defined by $C^1$. This type of characteristic set combination may be used, for example, to specify higher fidelity, modified deblock filtering or other special processing for a set of pixels in a region of a screen that possesses particular chromaticity characteristics.

A user interface may be provided to allow a user (e.g. a human artist) to provide user input to specify one or more characteristic sets $C^x$ and characteristic value sets. User interface tools may allow a user to identify a region of interest in a video frame. For example, a user interface may permit an artist to use a pointing device to draw a shape around a region of a displayed content frame. The user interface may allow the user to identify one or more characteristics, such as a range of luma and/or chroma values, for example, using text input or value sliders. A user interface may allow a user to specify a region of colors, for example, using a color map, such as the color map example shown in FIG. 5. A user interface may allow a user to specify a target depth or a range of depth values, for example, using text input or a 'value slider' interface. A user interface may allow a user to specify an edge orientation, edge strength or texture classification.

A user interface may be configured to permit a user to point to a visual representation of content, for example, to aid selection of values to define a characteristic set. For example, a user may point to a location (x,y) in a displayed content frame. A user interface may respond by identifying one or more values associated with that location (e.g. luma, chroma, depth, edge strength, texture classification). A user interface may allow a user to select a range of values that comprise or are centered on the value associated with the selected location. A user interface may display an indication (e.g. an outline or highlight) in a displayed content frame, for example, to identify a set of locations $P_{ART}$ (e.g. a set of pixels) that correspond to one or more characteristic value sets defined by values or ranges of values selected in the user interface. A composite characteristic set may be famed, for example, from a combination of two or more characteristic sets of any characteristic set types. A composite characteristic set may specify artistic intent for positions that satisfy two or more characteristic sets or positions that satisfy at least one characteristic set (e.g., at least one of multiple characteristic sets selected or defined by a user).

A user interface may allow the user to select and/or configure coding tools to process artistic set locations $P_{ART}$. As an example, a user interface may allow a user to specify application of a fidelity enhancement and a value for a QP adjustment applicable to pixels and/or blocks associated with an artistic set. An interface may allow a user to specify application of an enhanced loop filter or a modified post processing stage to pixels and/or blocks associated with the artistic set. A user interface may allow a user to specify and/or configure one or more coding tools to be added or modified for processing the artistic set locations.

Figure 13:
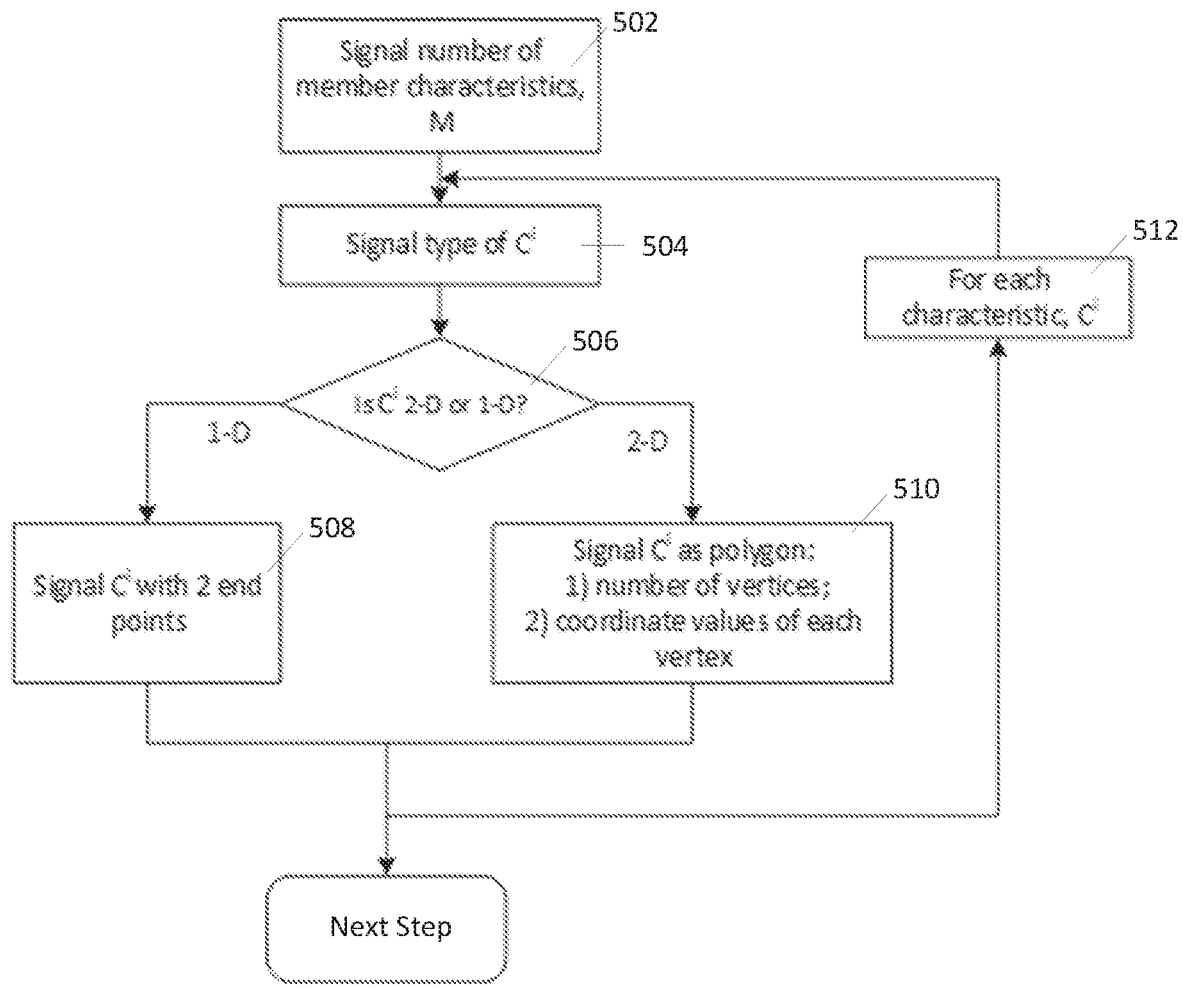
FIG. 13 is an example flow chart of $C_{ART}$ signaling.

FIG. 13 is an example flow chart of $C_{ART}$ signaling. In an example shown in FIG. 13, M, the total number of member characteristics in $C_{ART}$, may be signaled such as sent and/or received (e.g., at 502). For a member characteristic $C^i$, where i=0 to M−1, a type of characteristic may be signaled such as sent and/or received (e.g., at 504). A type of characteristic may be, for example, luminance, chromaticity, depth, spatial location, edge orientation, edge strength, texture property or classification and audio property or effect. A type of $C^i$ may be, for example, 2-D or 1-D. For example, a determination may be made as to whether the type of $C^i$ may be, for example, 2-D (two-dimensional) or 1-D (one-dimensional) (e.g., at 506). In examples (e.g., based on the determination at 506), the range of $C^i$ may be signaled such as sent and/or received, for example, by specifying two end points (e.g. if 1-D) (e.g., at 508) or a polygon representation of $C^i$ (e.g. if 2-D) (e.g., at 510). A polygon representation may be signaled such as sent and/or received by signaling a number of vertices and vertex coordinates (e.g., at 510). As such, in examples, a range of the type of characteristic for a member characteristic $C^i$ may be used including sent and/or received (e.g., signaled) using end points when, based on the determination, the member characteristic $C^i$ may be one-dimensional or a polygon representation of the type of characteristic for the member characteristic $C^i$ may be used including sent and/or received (e.g., signaled) when, based on the determination, the member characteristic $C^i$ may be two-dimensional. In examples, the range of the type of characteristic for a member characteristic $C^i$ and/or the polygon representation of the type of characteristic for the member characteristic $C^i$ may be used in at least one of encoding, decoding, delivery, processing and error resilience. As shown, this may be repeated for each member characteristic $C^i$ (e.g., as shown at 512) in the set of characteristics having the total number of characteristics or until reaching the total number of characteristics in the set.

$C_{ART}$ signaling, e.g., in a coded video bitstream, may be sent, for example, at a sequence level (e.g. in Sequence Parameter Set, Picture Parameter Set, Video Parameter Set), a picture level (e.g. Picture Parameter Set, slice segment header) or slice level (e.g. slice segment header). Signaling of $C_{ART}$ may be sent as an SEI message. An SEI message, which may be received, parsed and interpreted at a receiver, may be used to guide one or more post processing steps, for example, to improve the quality of areas having artistic intent samples. Post processing techniques may comprise Adaptive Loop Filters applied in a post-loop manner, cross component filtering, etc.

Coding tools may be designed and/or modified to support preservation of artistic intent. Quantization may introduce information loss and signal distortion during compression. Large quantization step sizes may lead to significant information loss, which may mean reconstructed video may comprise visible coding artifacts. Significant information loss may be undesirable, especially for areas that comprise samples corresponding to artistic intent expression, $P_{ART}$ positions. Signal fidelity of samples located at $P_{ART}$ may be preserved, for example, by applying finer quantization step sizes to code the prediction residual of corresponding $P_{ART}$ samples.

Figure 14:
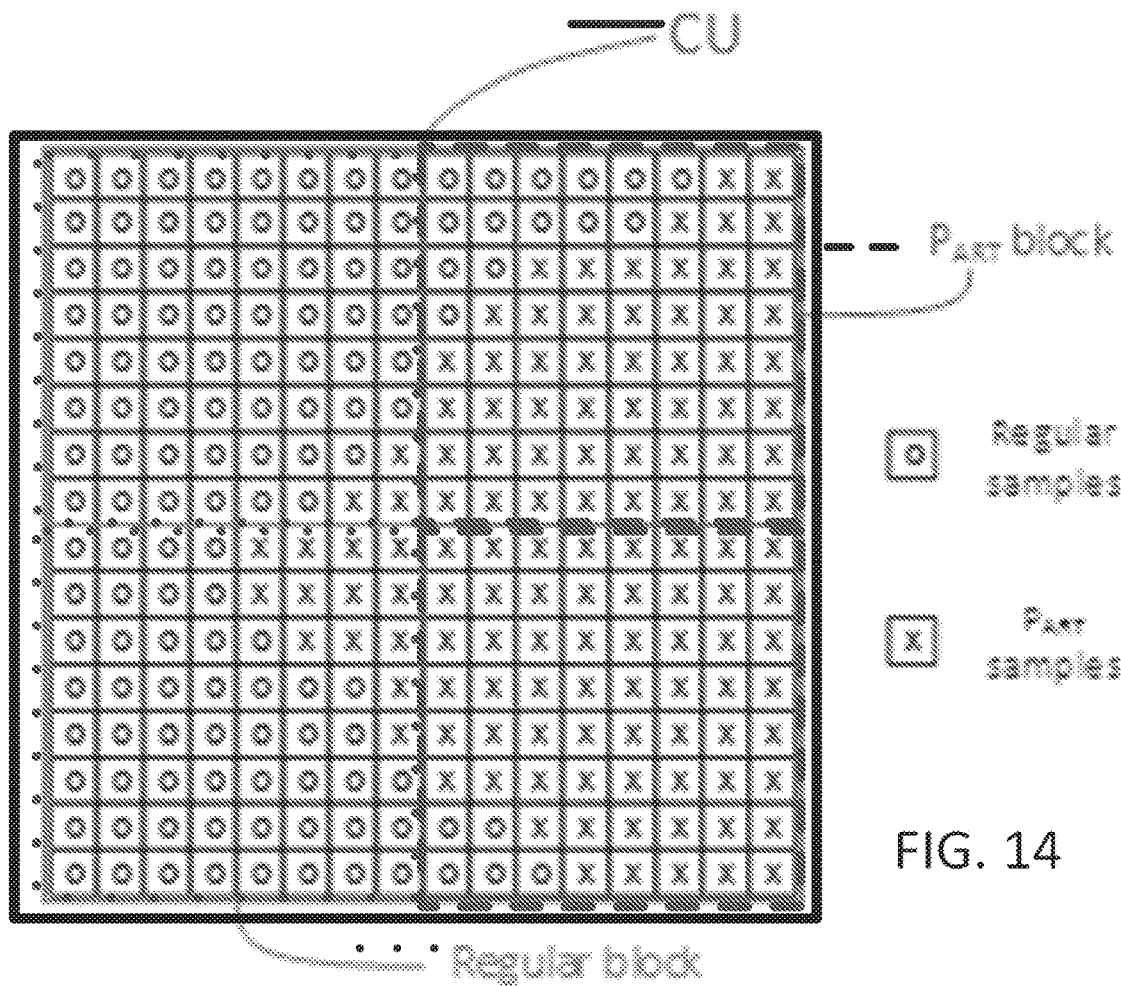
FIG. 14 is an example of a coding unit (CU) with $P_{ART}$ blocks and regular blocks.

FIG. 14 is an example of a coding unit (CU) with $P_{ART}$ blocks and regular blocks. FIG. 14 presents a CU with some $P_{ART}$ samples ("x" samples) and some regular samples ("o" samples). Divisions and treatment may be block based, for example, rather than sample based. As an example, the CU in FIG. 14 may be divided into four blocks. Two blocks on the left primarily comprise regular samples. Blocks with primarily regular samples may be labeled regular blocks. Two blocks on the right primarily comprise $P_{ART}$ samples. Blocks with primarily $P_{ART}$ samples may be labeled $P_{ART}$ blocks.

Finer quantization may be applied to blocks labeled $P_{ART}$ blocks. CU-level QP adjustment in HEVC may be used to apply finer quantization. However, CU level QP adjustment may not provide sufficient granularity. Application of CU level QP adjustment in the example shown in FIG. 14 may apply the same QP to samples in the same CU. A smaller CU-level QP may mean regular blocks may be quantized less, which may cause an increase in bit rate. A larger CU-level QP may mean $P_{ART}$ blocks may suffer more distortion.

$P_{ART}$ samples may be preserved with high fidelity, for example, by specifying delta QP values at a high level. A high level may be, for example, a sequence level, picture level or slice level. This may be referred to as artistic intent based QP adjustment. $P_{ART}$ samples may be preserved by quantizing $P_{ART}$ blocks (e.g. blocks comprising mostly $P_{ART}$ samples). $P_{ART}$ samples may be identified, for example, as previously discussed using, for example, signaled $C_{ART}$ parameters. A block may be identified as a $P_{ART}$ block, for example, when a block comprises a portion, percentage or other threshold level of $P_{ART}$ samples. As an example, a threshold may be set to 10 percent or 25 percent, such that any block comprising more than 10 percent or more than 25 percent $P_{ART}$ samples is identified as a $P_{ART}$ block.

Artistic intent QP adjustment may be applied to $P_{ART}$ blocks. Delta QP values signaled at a high level may, for example, be used in a QP adjustment, e.g., by subtracting a delta QP from a regular QP value to generate a reduced QP value. A reduced QP value may be applied to $P_{ART}$ blocks to achieve finer quantization. Values for a block decision threshold and a delta QP value may be static or dynamic and fixed or variable (e.g. values may be configurable by a user such as a human artist and may be signaled in a content bitstream).

A varying QP adjustment may be applied to a block depending, for example, on a number or fraction of $P_{ART}$ samples in a block. A varying QP adjustment may be limited, for example, based on a value of deltaQP_max. A maximum delta QP value (e.g. deltaQP_max) may be defined, e.g., by a human artist. For example, a block having a number of $P_{ART}$ pixels may be subject to QP adjustment where deltaQP is computed according to Eq. 4:

$$\text{delta}QP = \text{round}(\text{num}(P_{ART})/\text{num}(\text{block})*\text{delta}QP\_\text{max}) \quad \text{Eq. 4}$$

In Eq. 4, num($P_{ART}$) is a number of $P_{ART}$ pixels in a current block, num(block) is a total number of pixels in the current block, deltaQP_max is a maximum QP adjustment for the current artistic set and round( ) is a rounding operation. A rounding operation may ensure that the deltaQP has integer values.

Determination of $P_{ART}$ blocks, in lieu of or in addition to determination of $P_{ART}$ samples, may be eliminated, for example, for blocks that are not subject to application of a transform before quantization. For some blocks, a transform is applied to a block of prediction residuals (some of which may correspond to $P_{ART}$ samples and others to regular samples) to generate transform coefficients that may be quantized.

At a TU level in HEVC, for example, a transform skip mode may be enabled. Quantization may be applied, for example in transform skip mode, directly to prediction residuals in the spatial domain. Identification of $P_{ART}$ blocks may be eliminated, for example, given that different quantization step sizes may be applied to individual sample locations. Different step sizes may, for example, depend on whether a sample is a $P_{ART}$ sample or a regular sample.

Artistic intent based QP adjustment may have one or more delta QP values. A QP value may correspond to one or more color components. Quantization step sizes may be adjusted independently for different color components. Values of deltaQP and/or deltaQP_max may be configured by a user.

Coding tools may be originally designed and/or modified to preserve artistic intent. A deblocking filter may be modified to preserve artistic intent. As an example, a deblocking filter in H.264 and HEVC may be used to reduce blocking artifacts between block boundaries and improve subjective quality.

Figure 15:
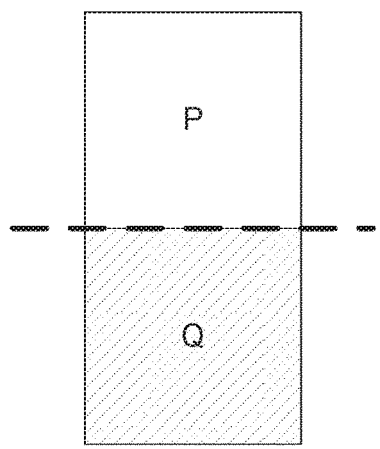
FIG. 15 is an example of deblocking with a neighboring blocks and a current block.
Figure 15:
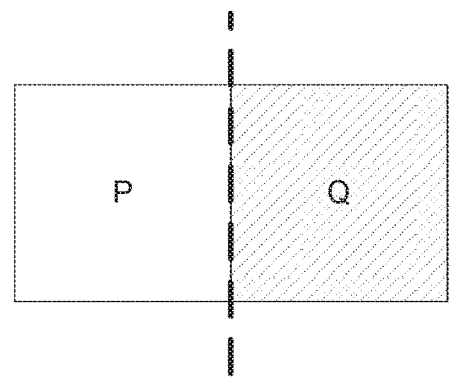

FIG. 15 is an example of deblocking with a neighboring block (block P) and a current block (block Q). As shown in FIG. 15, deblocking may be applied to horizontal and vertical block boundaries. Deblocking may be applied, for example, by identifying a neighboring block (e.g. block P) of a current block (e.g. block Q). Identification of a neighboring block may depend, for example, on an edge direction.

A boundary strength (Bs) parameter between P and Q may be calculated. Calculation of Bs may depend, for example, on coding modes of P and Q, reference pictures of P and Q, motion vectors of P and Q and/or whether any non-zero transform coefficients exist in block P or block Q. Bs may control a strength of a deblocking filter, which may be applied to neighboring samples in P and Q.

An adaptive deblocking filter may be applied separately to a luma component and chroma components. Samples on each side of a block boundary may be filtered, for example, depending on the value of Bs. A value of Bs may, for example, be up to four luma or chroma.

Boundary strength Bs may be decided, for example, by taking into account whether P and/or Q is a $P_{ART}$ block. A value of Bs may be increased such that stronger deblocking filter is applied to provide higher subjective quality, for example, when one or more of P and Q is a $P_{ART}$ block. Deblocking complexity may be simplified. As an example, chroma components in HEVC may be filtered, for example, when Bs is greater than 1. Simplification may result in insufficient quality of chromaticity in the reconstructed signal for artistic intent preservation purposes. A stronger deblocking filter may be applied for chroma components, for example, by applying deblocking filter when Bs is equal to 1.

QP values of block P and block Q may be denoted as QP(P) and QP(Q), respectively. A deblocking filtering process of H.264 and HEVC may be adaptive, for example, based on a number of factors, such as values of QP(P) and QP(Q). Values of QP(P) and QP(Q) used during adaptive deblocking filtering may be from block QP values before or after artistic intent based QP adjustment is applied.

Figure 16:
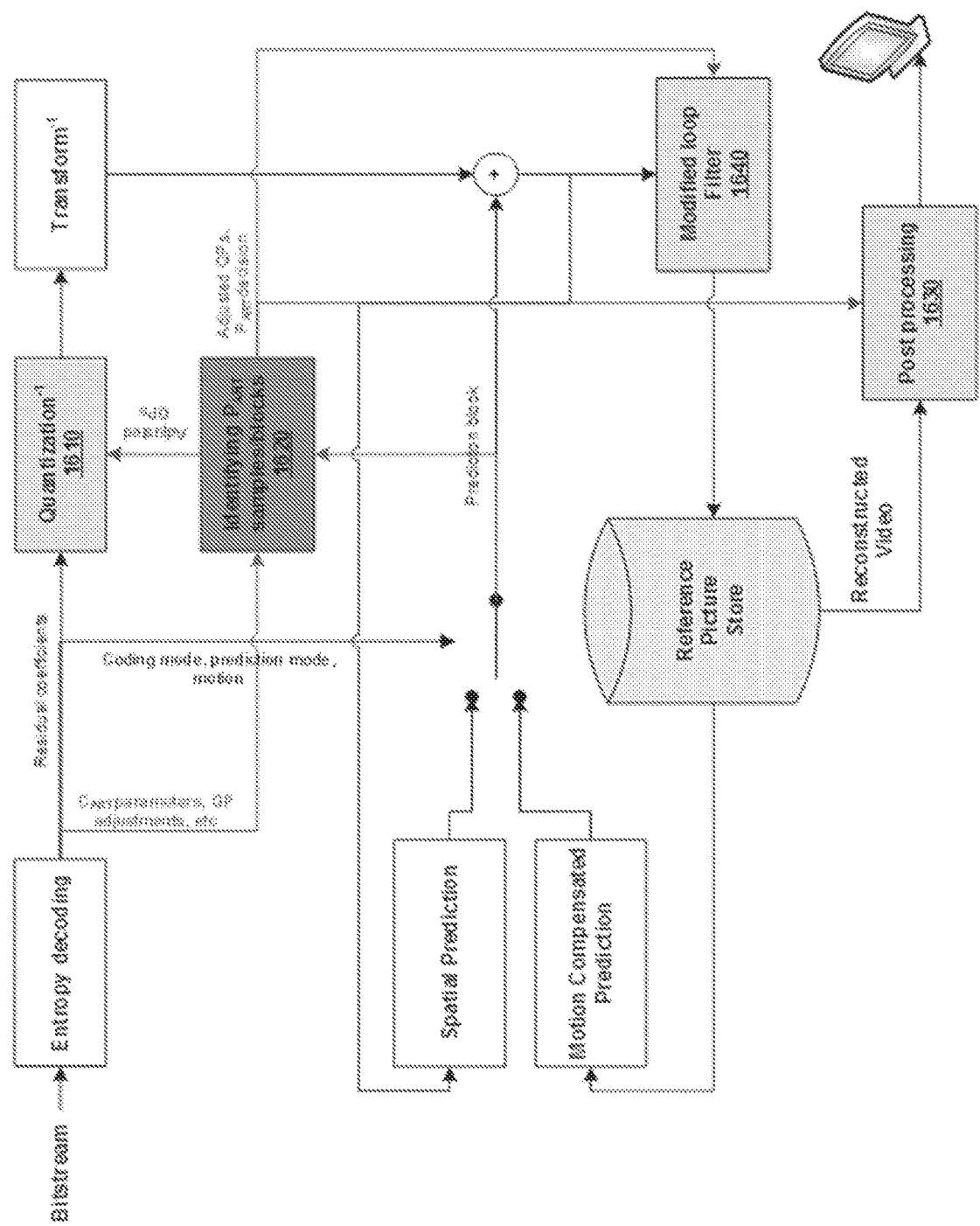
FIG. 16 is a diagram of an example of a block based video decoder for artistic intent preservation.

FIG. 16 is a diagram of an example of a block based video decoder for artistic intent preservation. FIG. 16 illustrates a modified version of the block-based hybrid video decoder diagram shown in FIG. 2. As shown in FIG. 16, an input bitstream is entropy decoded and the bitstream is unpacked.

Mode and motion information and $C_{ART}$ parameters may be retrieved from the bitstream. $C_{ART}$ parameters may be used with predicted samples (or with reconstructed samples), for example, to determine which blocks/samples are $P_{ART}$ blocks/samples (1620). Modified inverse quantization (1610) and modified loop filters (1640) may be applied, for example, depending on the determination which blocks/samples are $P_{ART}$ blocks/samples, $P_{ART}$ block/sample decisions (1620) may be used to apply post processing (1630) to the reconstructed pictures, for example, to further restore and/or enhance artistic intent in pictures rendered on the display. Post processing may comprise, for example, Adaptive Loop Filters (e.g. used as post filters) and/or cross component chroma enhancement filters.

Block-based hybrid video decoding is presented as an example in FIG. 16. Artistic intent preservation techniques are applicable to other types of video coding systems. $C_{ART}$ signaling and $P_{ART}$ identification techniques are applicable to a variety of coding systems. For example, signaling $C_{ART}$ parameters may be combined with a wavelet based video coding system or an object based video coding system to preserve artistic intent.

Signaled artistic intent characteristics (e.g. $C_{ART}$ parameters) may be used to improve or enhance error resilience/robustness of a video delivery system, such as one that relies on error prone channels (e.g. wireless channels). For example, during transmission, a portion of a bitstream may be lost (e.g. due to corrupted or lost packets). A decoder may detect that lost samples correspond to $P_{ART}$ blocks/samples. An enhanced error concealment algorithm may be applied to conceal lost blocks/samples.

In an example, a depth characteristic may be signaled in $C_{ART}$. A decoder may refer to a corresponding depth map (assuming a depth map is received) to determine whether lost samples correspond to $P_{ART}$ blocks/samples. In an example, a spatial characteristic may be signaled in $C_{ART}$. A decoder may determine locations of lost samples to determine whether they correspond to $P_{ART}$ blocks/samples. A decoder may choose appropriate error concealment strategy to improve video quality. In an example, a chromaticity (or luminance) characteristic may be signaled in $C_{ART}$. A decoder may determine whether the lost samples correspond to $P_{ART}$ positions. A decoder may not know the sample values of lost samples. A decoder may, for example, use available neighboring samples (for example, spatial neighboring samples and/or temporal neighboring samples) to help decide whether lost samples correspond to $P_{ART}$ positions, and to choose appropriate error concealment techniques.

An encoder may compress more important or prioritized samples, e.g. $P_{ART}$ samples, in different slices/tiles. Important slices/tiles may be associated with higher priority in a content delivery (e.g. transmission) stage and/or other stage. For example, enhanced error protection (e.g. stronger FEC code) and/or enhanced retransmission may be used to improve QoS based on $C_{ART}$ signaling. A transmitter/packetizer may, for example, use $C_{ART}$ signaling information in an elementary stream to determine QoS parameters (e.g. error protection rate, transmission priority) for transmission/packetization.

A set of positions in content with more or less importance may be identified. $C_{ART}$ is a set of characteristic values with enhanced importance with regard to artistic intent. $P_{ART}$ is a set of sample positions with enhanced importance with regard to artistic intent. Artistic intent characteristics $C_{ART}$ may be signaled and used to identify a set of artistic intent positions $P_{ART}$ (e.g., as described herein). Sets of positions with different importance levels may be identified.

A set of positions with reduced (e.g. very low) importance may be identified, for example, during a content creation process. An artist may expressly or impliedly identify a set of characteristic values and/or a set of sample positions as having "low importance." It may be implied that no artistic intent is expressed when, for example, an artist did not pay additional attention to a set of sample positions. Positions having implied or express reduction of importance may be "de-emphasized" during coding, post processing, and/or error resilience. For example, more severe quantization may be applied during coding, loop filtering or post filtering may be simplified or eliminated, and/or less robust error protection may be used for reduced importance sample positions.

Figure 17:
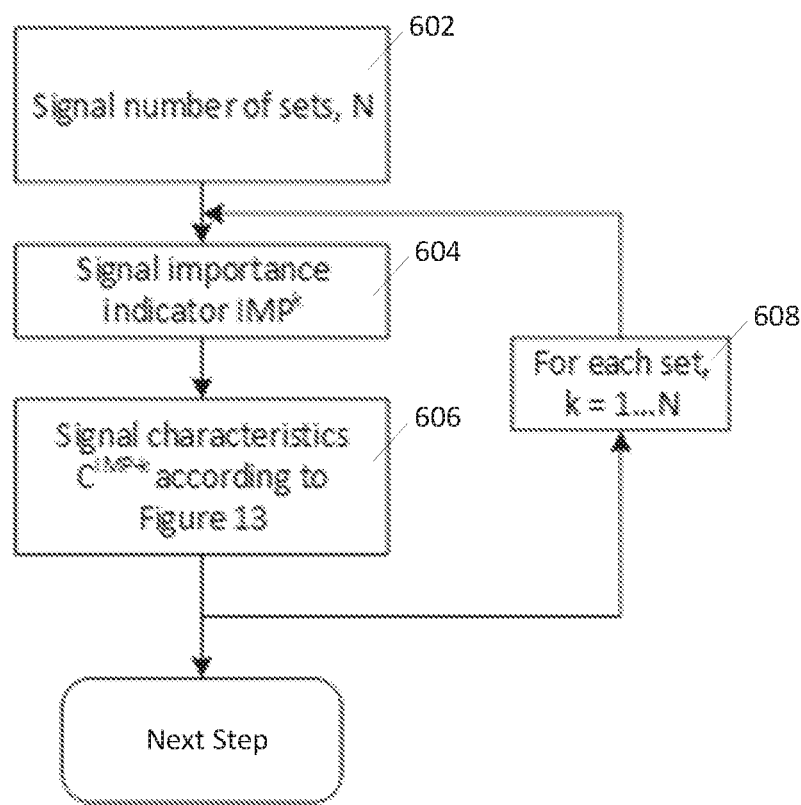
FIG. 17 is an example flow chart of signaling an importance level for any set of positions.

FIG. 17 is an example flow chart of signaling an importance level for any set of positions. Multiple sets of characteristics, $C^{IMP-k}$, k=1 ... N, may signaled (e.g., at 602). An associated set of sample positions $P^{IMP-k}$ may be identified (not shown, for example, after 602). An importance indicator, $IMP^k$, may be assigned and signaled for one or more sets $C^{IMP-k}$ (e.g., at 604). FIG. 13 presents an example of a $C_{ART}$ signaling flowchart that may be used for a generalized signaling framework shown in FIG. 17. For example, the characteristics $C^{IMP-k}$ may be signaled such as sent and/or received as described in FIG. 13 (e.g., at 606). This may be repeated (e.g., as shown by 608) for each set.

Appropriate coding, post processing, and/or error resilience measures may be applied, for example, based on an importance indicator. Generalized importance signaling may permit a video delivery chain to enhance resource allocation among sets of sample positions with different importance levels. Resource allocation may comprise bit rate allocation during compression (e.g. more bits spent on signals having higher importance). Resource allocation may comprise computing resource allocation (e.g. better processing and preservation of signals having higher importance). Resource allocation may comprise error protection resource allocation (e.g. more robust error protection of signals having higher importance).

Configuration parameters for coding tools may be derived from importance indicator values. For example, an importance indicator may be signaled as a value between 0 and 100. For signaled QP values, an importance indicator above 50 may indicate a reduction in QP while an importance indicator below 50 may indicate an increase in QP. In an example, a value of deltaQP may be computed based on an absolute difference between the importance indicator and 50. Other configuration parameters (e.g. deblocking filter selection, boundary strength, channel coding strength, acceptable number of retransmissions, acceptable computation level for error concealment) may be computed based on an importance indicator.

Relevant configuration parameters may be derived using a combined importance indicator, for example, when positions (e.g. pixels) from different artistic intent sets with different importance indicators are mixed together in a unit (e.g. in a block, a slice, a packet to be transmitted). For example, a weighted combination of importance indicators of pixels in a unit may be computed, weighted by the number of pixels sharing an importance indicator and a resulting combined importance indicator may be used to derive configuration parameters for the unit.

A location (x,y) may belong to more than one artistic intent set specification. For example, a first artistic intent set specification may comprise a spatial region of a current frame. A second (e.g., separate) artistic intent set specification may comprise a range of values for a first chroma component. The first artistic intent set specification may be associated with a first importance indicator $IMP^1$. The second artistic intent set specification may be associated with a second importance indicator $IMP^2$. A location (x,y) may be in the spatial region of the first artistic intent set specification and may have a chroma component that satisfies the range of values of the second artistic intent set specification. A location (x,y) may be associated with more than one artistic set specification.

A location (x, y) may be associated with more than one importance indicator. In an example, a combined importance indicator may be determined for location (x,y). The combined importance indicator may be a combination of multiple importance indicators associated with position (x,y).

For example, multiple importance indicators may be added or averaged to determine a combined importance indicator for location (x,y). A maximum or minimum value of multiple importance indicators may be computed to determine a combined importance indicator for location (x,y). The combined importance indicator may be used as the importance indicator value for determining how location (x,y) and/or how blocks comprising location (x,y) should be processed, e.g., using added and/or modified coding tools.

Coding general importance indicators for various artistic intent sets may provide a convenient vehicle for a user (e.g. a human artist) to indicate importance levels for artistic intent sets. General importance indicators may reduce individual determinations. General importance indicators may be used to set configuration parameters for various coding tools that process artistic intent sets. A user may desire more fine grained control over processing of identified artistic intent sets. A user interface may allow a user to specify detailed configuration parameters for various tools (e.g. coding tools, delivery tools, error concealment tools). A detailed set of configuration parameters may be signaled for one or more artistic sets. Tool configuration parameters may be signaled in addition to, or in place of signaling $IMP^k$, e.g., as in the example shown in FIG. 17.

Generalized signaling may permit $C_{ART}$ signaling to be more efficient. For example $P_{NON-ART}$ may be defined as a set of positions with no artistic intent (e.g. low importance). $C_{NON-ART}$ may be defined as a set of "non artistic intent" characteristics shared by a number or percentage of (e.g. all) positions in $P_{NON-ART}$. Signaling of $C_{NON-ART}$ may result in less overhead than signaling $C_{ART}$.

Figure 18A:
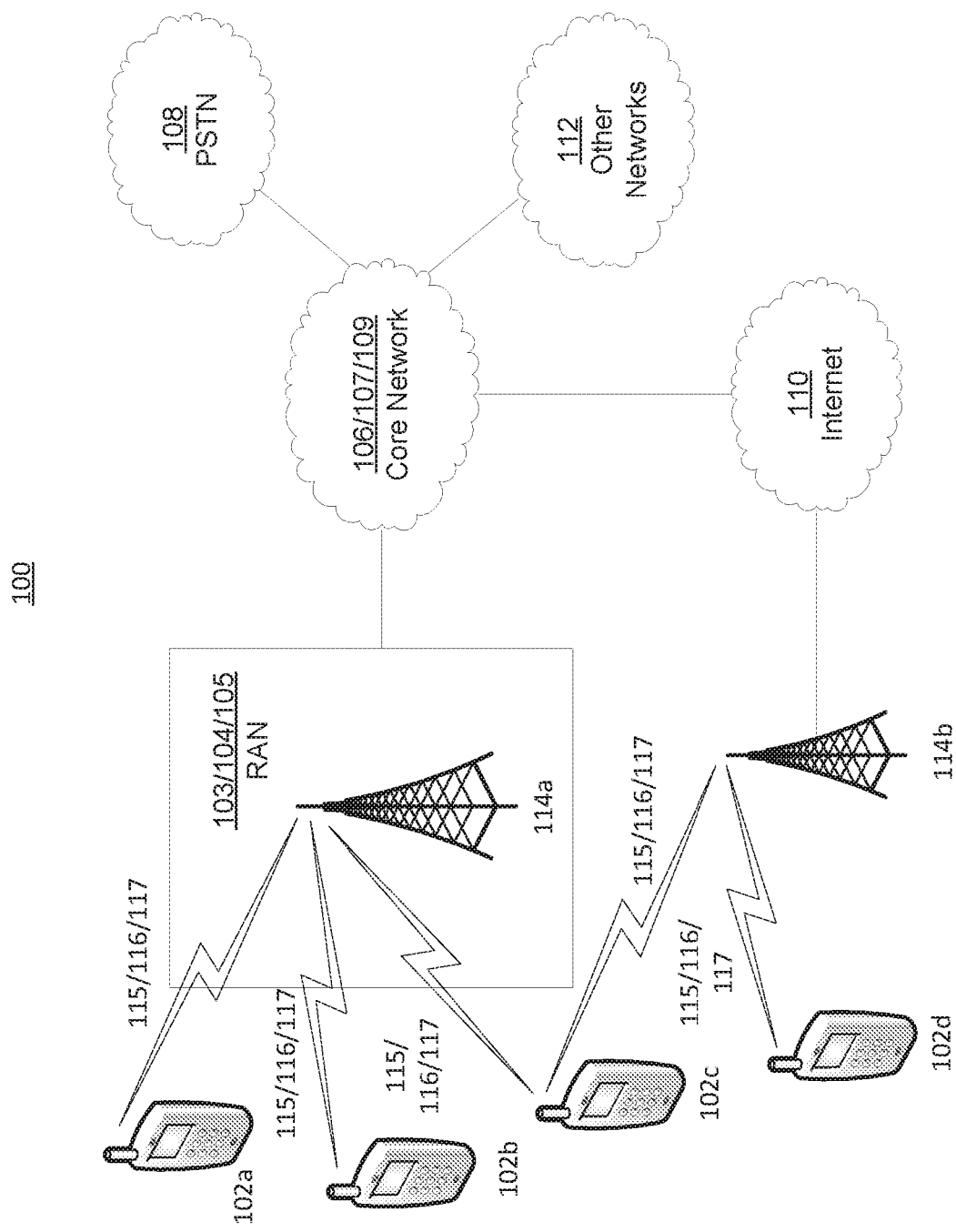
FIG. 18A is a system diagram of an example communications system in which one or more disclosed embodiments may be implemented.

FIG. 18A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 18A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102h, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102h, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 18A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 18A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 18A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102h, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 18A may be configured to communicate with the base station 114a, which may employ a cellular-based radio technology, and with the base station 114b, which may employ an IEEE 802 radio technology.

Figure 18B:
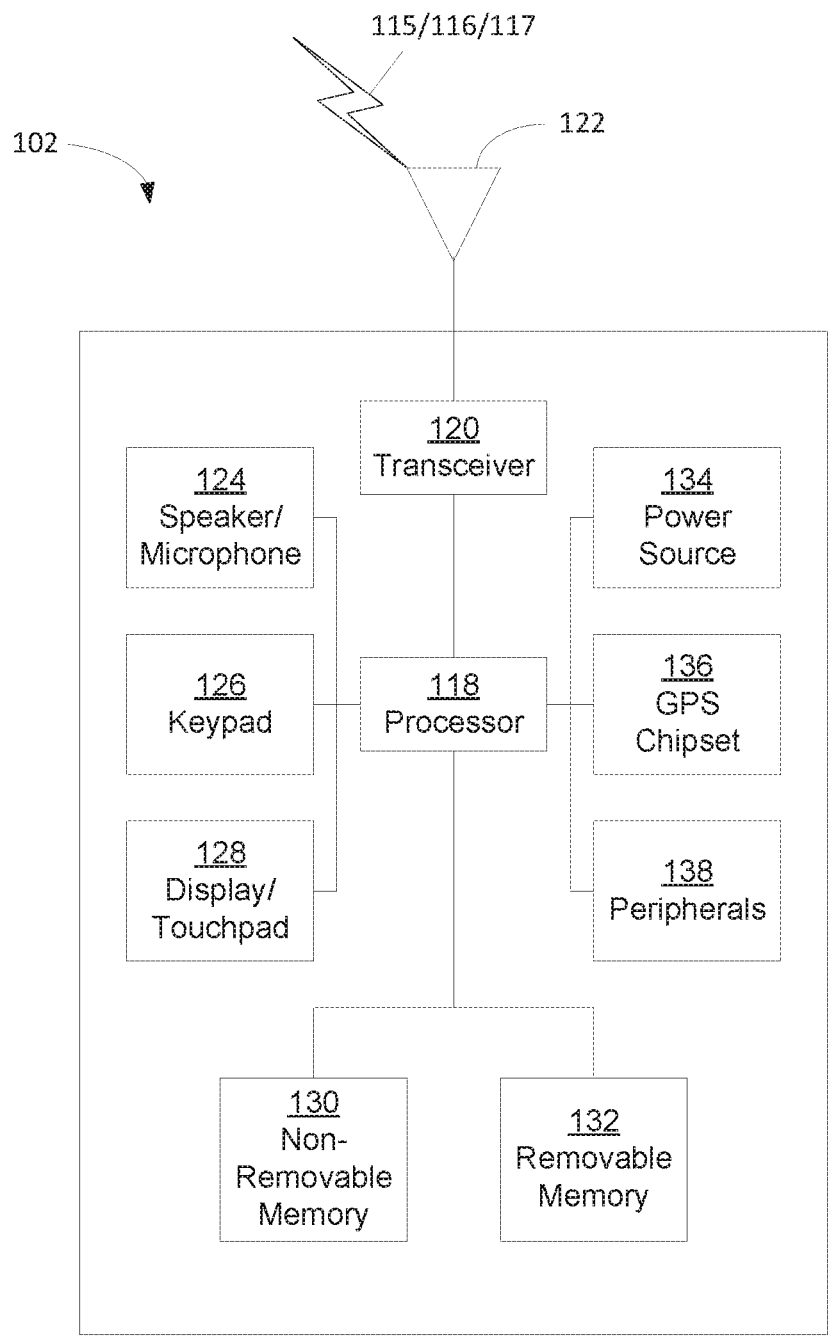
FIG. 18B is a system diagram of an example wireless transmit/receive unit (WTRU) that may be used within the communications system illustrated in FIG. 18A.

FIG. 18B is a system diagram of an example WTRU 102. As shown in FIG. 18B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 18B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 18B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 18B as a single element, the WTRU 102 may include any number of transmit/receive elements 122. More specifically, the WTRU 102 may employ MINK) technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as URA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLEO) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an c-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 18C:
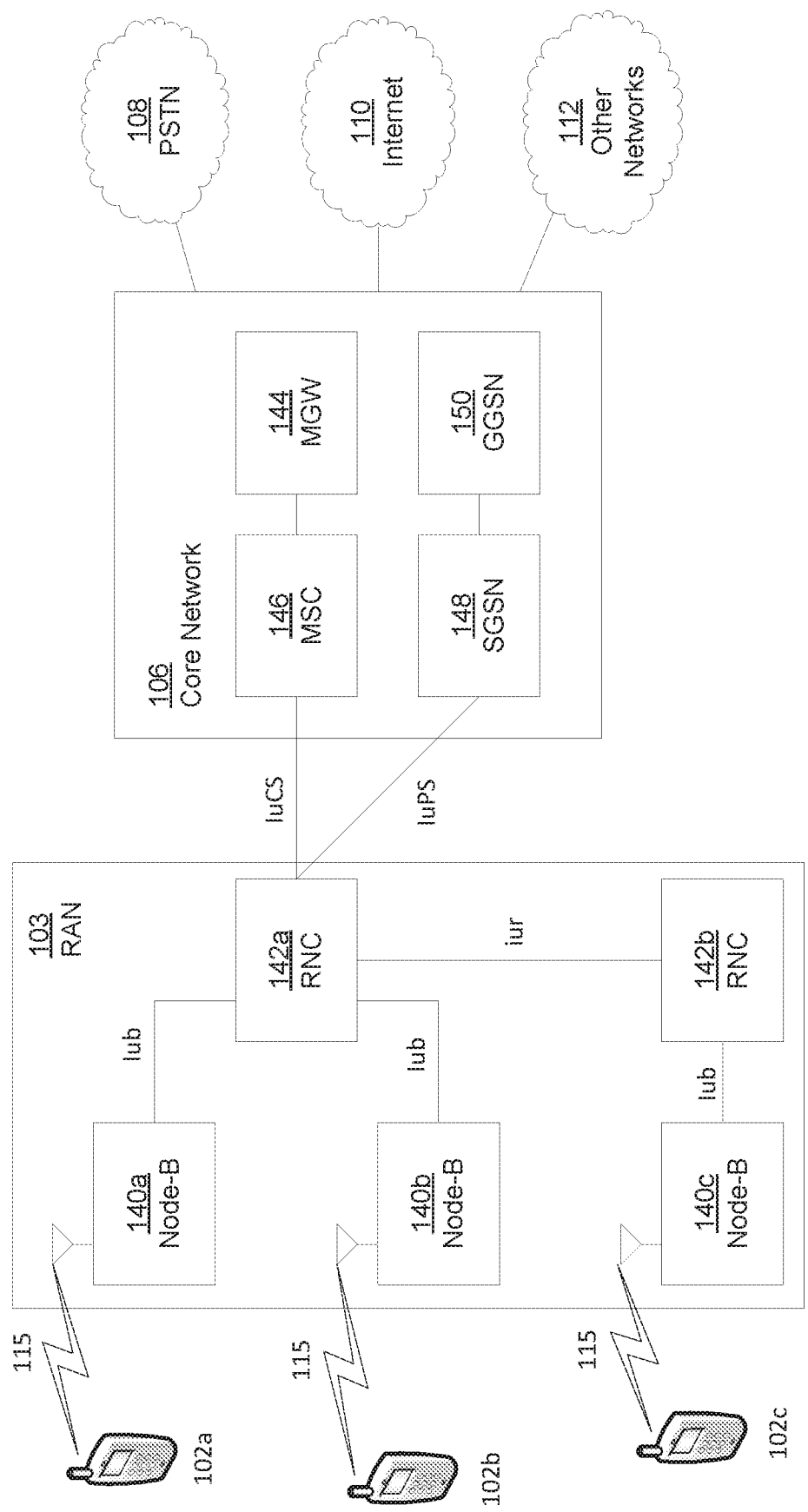
FIG. 18C is a system diagram of an example radio access network and an example core network that may be used within the communications system illustrated in FIG. 18l.

FIG. 18C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 18C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 18C, the Node-Bs 140a, 140h may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 18C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 18D:
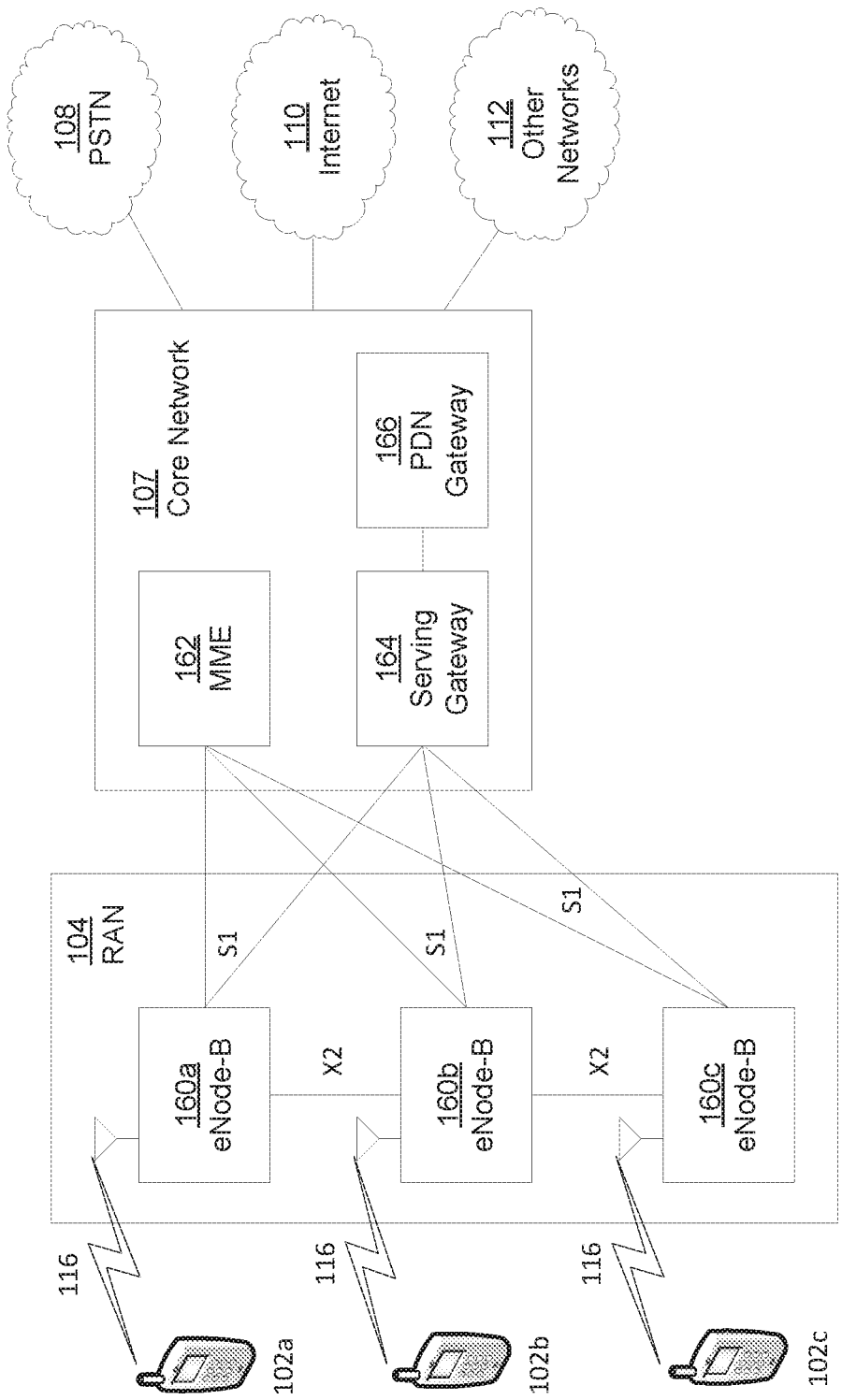
FIG. 18D is a system diagram of another example radio access network and an example core network that may be used within the communications system illustrated in FIG. 18A.

FIG. 18D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a. 160b. 160c, though it will be appreciated that the RAN 104 may include any number of eNode-Bs while remaining consistent with an embodiment. The eNode-Bs 160a, 160h, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a. 160b, 160c may be associated with a particular cell (not shown) and may be configured to handle radio resource management decisions, handover decisions, scheduling of users in the uplink and/or downlink, and the like. As shown in FIG. 18D, the eNode-Bs 160a, 160h, 160c may communicate with one another over an X2 interface.

The core network 107 shown in FIG. 18D may include a mobility management gateway (MME) 162, a serving gateway 164, and a packet data network (PON) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102h, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 18E:
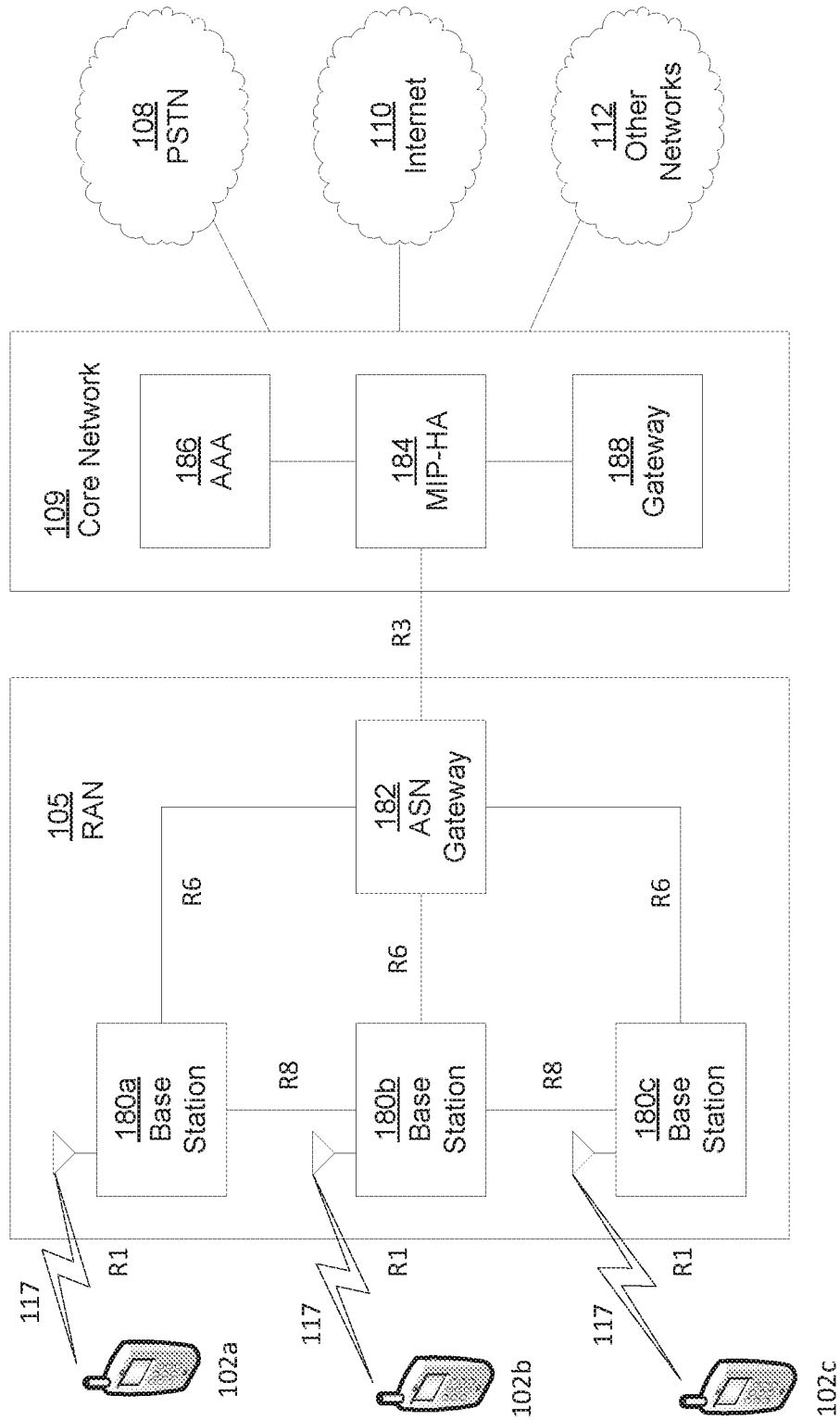
FIG. 18E is a system diagram of another example radio access network and an example core network that may be used within the communications system illustrated in FIG. 18A.

FIG. 18E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 18E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102h, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180h, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 18E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102h, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102h, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 18E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b. 102c between the RAN 105 and the other ASNs. The communication link between the core network 109 and the other core networks may be defined as an R5 reference, which may include protocols for facilitating interworking between home core networks and visited core networks.

Systems, methods, and instrumentalities have been disclosed for artistic intent based content coding that preserves expressions of artistic intent in content. Expressions of artistic intent are identified (e.g. by signaling or content analysis) and expressed as a set of artistic intent positions $P_{ART}$ and artistic intent characteristics $C_{ART}$. Artistic intent characteristics $C_{ART}$ may be signaled and used to identify artistic intent positions $P_{ART}$. Artistic intent preservation coding and processing may be applied to sample positions $P_{ART}$ to preserve characteristics $C_{ART}$. A coding user interface may permit a user to specify an artistic set (e.g. $P_{ART}$ and/or $C_{ART}$) and to select and/or configure treatment of pixels and/or blocks associated with an artistic set, such as a fidelity enhancement, QP adjustment value and/or post-processing. Content priority or importance levels may be impliedly and/or expressly indicated at fine (e.g. pixel, sample) and/or coarse (e.g. block) levels of content for varying (e.g. enhanced, reduced) levels of treatment in content coding, delivery, processing and/or error resilience/robustness.

Although the terms pixel, sample, sample value, and/or the like may be used herein, it may and should be understood that the use of such terms may be used interchangeably and, as such, may not be distinguishable.

Similarly, although the term characteristic, characteristic set, characteristics of artistic intent, and/or the like may be used herein, it may and should be understood that the use of such terms may be used interchangeably and, as such, may not be distinguishable.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
   decoding from a bitstream sample values associated with sample locations of an image;
   receiving in the bitstream an indication of one or more characteristic sets, each characteristic set comprising a characteristic type, the characteristic type being one in a plurality of characteristic types;
   receiving in the bitstream an indication of a description of the one or more characteristic sets, the description comprising characteristic values associated with the one or more characteristic sets;
   determining a subset of the sample locations, the subset of sample locations having characteristic values corresponding to characteristic values associated with the one or more characteristic sets; and
   determining, based at least on the subset of sample locations having characteristic values corresponding to characteristic values associated with the one or more characteristic sets, to apply modified processing to the subset of the sample locations.

2. The method of claim 1, wherein the characteristic type comprises one of luminance, chrominance, or chromaticity.

3. The method of claim 1, wherein the characteristic type comprises one of depth or contrast.

4. The method of claim 1, wherein the characteristic type comprises one of an edge property or a texture property.

5. The method of claim 4, wherein the edge property is one of edge presence, edge strength, or edge orientation.

6. The method of claim 1, wherein the description of the one or more characteristic sets identifies a range of values in a 1-D characteristic value space.

7. The method of claim 1, wherein the description of the one or more characteristic sets identifies a shape enclosing values in a 2-D characteristic value space or a volume of values in a 3-D characteristic value space.

8. The method of claim 1, wherein determining to apply modified processing to the subset of sample locations comprises determining to apply one or more of a quantization step size adjustment, a modified loop filter, a modified post-processing filter, a modified deblocking filter, or a cross-component filter.

9. The method of claim 1,
   wherein the one or more characteristic sets comprises at least two characteristic sets, and
   wherein determining the subset of the sample locations comprises determining the subset of the sample locations that have characteristic values corresponding to characteristic values associated with the at least two characteristic sets.

10. The method of claim 1, further comprising determining from the bitstream an importance level associated with the one or more characteristic sets,
    wherein determining to apply modified processing to the subset of sample locations comprises determining to apply modified processing based on the importance level and the subset of sample locations having characteristic values corresponding to characteristic values associated with the one or more characteristic sets.

11. A computing system, comprising:
    a processor programed to perform operations comprising:
    decoding from a bitstream sample values associated with sample locations of an image;
    receiving in the bitstream an indication of one or more characteristic sets, each characteristic set comprising a characteristic type, the characteristic type being one in a plurality of characteristic types;
    receiving in the bitstream an indication of a description of the one or more characteristic sets, the description comprising characteristic values associated with the one or more characteristic sets;
    determining a subset of the sample locations, the subset of sample locations having characteristic values corresponding to characteristic values associated with the one or more characteristic sets; and
    determining, based at least on the subset of sample locations having characteristic values corresponding to characteristic values associated with the one or more characteristic sets, to apply modified processing to the subset of the sample locations.

12. The computing system of claim 11, wherein the characteristic type comprises one of luminance, chrominance, or chromaticity.

13. The computing system of claim 11, wherein the characteristic type comprises one of depth or contrast.

14. The computing system of claim 11, wherein the characteristic type comprises one of an edge property or a texture property.

15. The computing system of claim 14, wherein the edge property is one of edge presence, edge strength, or edge orientation.

16. The computing system of claim 11, wherein the description of the one or more characteristic sets identifies a range of values in a 1-D characteristic value space.

17. The computing system of claim 11, wherein the description of the one or more characteristic sets identifies a shape enclosing values in a 2-D characteristic value space or a volume of values in a 3-D characteristic value space.

18. The computing system of claim 11, wherein determining to apply modified processing to the subset of sample locations comprises determining to apply one or more of a quantization step size adjustment, a modified loop filter, a modified post-processing filter, a modified deblocking filter, or a cross-component filter.

19. The computing system of claim 11, wherein the one or more characteristic sets comprises at least two characteristic sets, and wherein determining the subset of the sample locations comprises determining the subset of the sample locations that have characteristic values corresponding to characteristic values associated with the at least two characteristic sets.

20. The computing system of claim 11, wherein the processor is programmed to perform further operations comprising determining from the bitstream an importance level associated with the one or more characteristic sets,
   wherein determining to apply modified processing to the subset of sample locations comprises determining to apply modified processing based on the importance level and the subset of sample locations having characteristic values corresponding to characteristic values associated with the one or more characteristic sets.

21. A non-transitory computer readable medium having stored thereon instructions executable by one or more processors for performing operations comprising:
   decoding from a bitstream sample values associated with sample locations of an image;
   receiving in the bitstream an indication of one or more characteristic sets, each characteristic set comprising a characteristic type, the characteristic type being one in a plurality of characteristic types;
   receiving in the bitstream an indication of a description of the one or more characteristic sets, the description comprising characteristic values associated with the one or more characteristic sets;
   determining a subset of the sample locations, the subset of sample locations having characteristic values corresponding to characteristic values associated with the one or more characteristic sets; and
   determining, based at least on the subset of sample locations having characteristic values corresponding to characteristic values associated with the one or more characteristic sets, to apply modified processing to the subset of the sample locations.

22. The non-transitory computer readable medium of claim 21, wherein the characteristic type comprises one of luminance, chrominance, or chromaticity.

23. The non-transitory computer readable medium of claim 21, wherein the characteristic type comprises one of depth or contrast.

24. The non-transitory computer readable medium of claim 21, wherein the characteristic type comprises one of an edge property or a texture property.

* * * * *